United States Patent
Huang et al.

(10) Patent No.: US 12,261,699 B2
(45) Date of Patent: Mar. 25, 2025

(54) COMMUNICATION APPARATUS AND COMMUNICATION METHOD FOR HYBRID AUTOMATIC REPEAT REQUEST TRANSMISSION

(71) Applicant: Panasonic Intellectual Property Corporation of America, Torrance, CA (US)

(72) Inventors: Lei Huang, Singapore (SG); Yanyi Ding, Singapore (SG); Yoshio Urabe, Nara (JP); Rojan Chitrakar, Singapore (SG)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 461 days.

(21) Appl. No.: 17/618,400

(22) PCT Filed: May 18, 2020

(86) PCT No.: PCT/SG2020/050293
§ 371 (c)(1),
(2) Date: Dec. 10, 2021

(87) PCT Pub. No.: WO2021/006809
PCT Pub. Date: Jan. 14, 2021

(65) Prior Publication Data
US 2022/0278775 A1 Sep. 1, 2022

(30) Foreign Application Priority Data
Jul. 11, 2019 (SG) .......................... 10201906449W

(51) Int. Cl.
*H04L 1/1607* (2023.01)
*H04L 1/1812* (2023.01)
(Continued)

(52) U.S. Cl.
CPC .......... *H04L 1/1607* (2013.01); *H04L 1/1812* (2013.01); *H04W 28/065* (2013.01); *H04W 84/12* (2013.01)

(58) Field of Classification Search
CPC ............... H04L 1/1607; H04L 1/1812; H04W 28/065; H04W 84/12
(Continued)

(56) References Cited

U.S. PATENT DOCUMENTS

2012/0069830 A1\* 3/2012 Shi .................. H04L 1/0067
370/474
2014/0334476 A1\* 11/2014 Cheong ............... H04W 28/065
370/338
(Continued)

FOREIGN PATENT DOCUMENTS

WO  WO-2018119458 A2 \* 6/2018 ........... H04L 69/321

OTHER PUBLICATIONS

Hart et al., "Recommended Direction for EHT", IEEE 802.11-18/1549r0, Sep. 9, 2018. (19 pages).
(Continued)

*Primary Examiner* — Xuan Lu
(74) *Attorney, Agent, or Firm* — Seed IP Law Group LLP

(57) ABSTRACT

A communication apparatus comprising: circuitry, which, in operation, generates a transmission signal that includes a data field, the data field carrying an aggregated medium access control protocol data unit (A-MPDU) that is segmented into one or more code block; and a transmitter which, in operation, transmits the transmission signal to another communication apparatus; and wherein the A-MPDU comprises one or more A-MPDU subframe that are mapped to the one or more code block, such that an A-MPDU subframe not soliciting immediate acknowledgement and an A-MPDU subframe soliciting immediate acknowledgement are not mapped into a single code block.

14 Claims, 28 Drawing Sheets

(51) Int. Cl.
   *H04L 1/1829* (2023.01)
   *H04W 28/06* (2009.01)
   *H04W 84/12* (2009.01)
(58) Field of Classification Search
   USPC .......................................................... 370/338
   See application file for complete search history.

(56) References Cited

U.S. PATENT DOCUMENTS

| | | | |
|---|---|---|---|
| 2015/0036673 A1* | 2/2015 | Asterjadhi | H04W 28/065 |
| | | | 370/338 |
| 2015/0319776 A1* | 11/2015 | Seo | H04L 1/1822 |
| | | | 370/329 |
| 2017/0230149 A1* | 8/2017 | Wang | H04L 1/1819 |
| 2019/0379489 A1* | 12/2019 | Hwang | H04L 1/0063 |
| 2020/0382431 A1* | 12/2020 | Decarreau | H04L 1/08 |
| 2021/0409165 A1* | 12/2021 | Wang | H04L 1/1822 |

OTHER PUBLICATIONS

International Search Report, mailed Sep. 2, 2020, for International Application No. PCT/SG2020/050293. (4 pages).
Oteri, Kome, "Technology Features for 802.11 EHT", IEEE 802.11-18/1547r0, Sep. 7, 2018. (10 pages).
Shilo et al., "HARQ for EHT", IEEE 802.11-18/1587rl, Sep. 3, 2018. (15 pages).
Zhang et al., "HARQ Feasibility for EHT", IEEE 802.11-18/1992r1, Jan. 9, 2019. (31 pages).

* cited by examiner

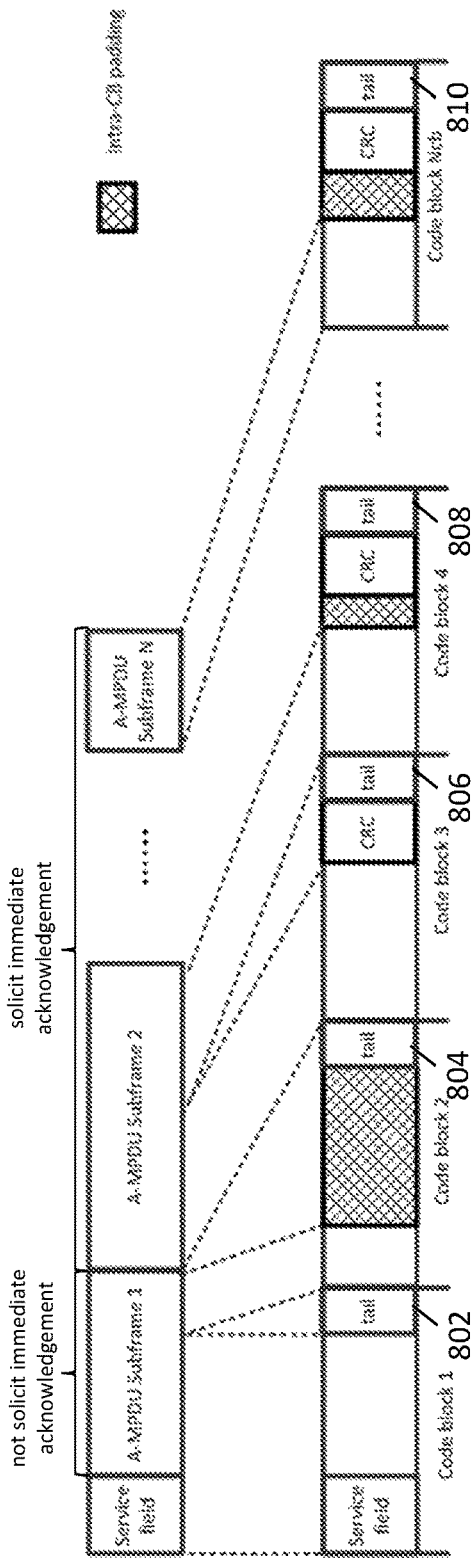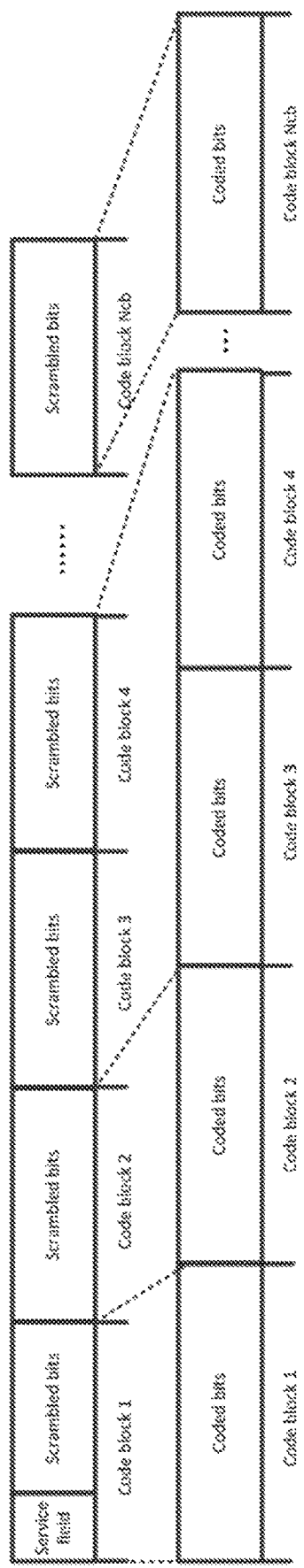
Fig. 8

COMMUNICATION APPARATUS AND COMMUNICATION METHOD FOR HYBRID AUTOMATIC REPEAT REQUEST TRANSMISSION

TECHNICAL FIELD

The present disclosure relates to communication apparatuses and methods for hybrid automatic repeat request (HARQ) operation, and more particularly to communication apparatuses and methods for HARQ transmission in Extremely High Throughput (EHT) Wireless Local Area Network (WLAN).

BACKGROUND

In the standardization of next generation wireless local area network (WLAN), a new radio access technology having backward compatibilities with IEEE 802.11a/b/g/n/ac/ax technologies has been discussed in the IEEE 802.11 Working Group and is named 802.11 be Extremely High Throughput (EHT) WLAN.

In IEEE 802.11be EHT WLAN, in order to provide better link adaptation and higher throughput over 802.11ax high efficiency (HE) WLAN, it is desired to increase the maximum channel bandwidth from 160 MHz to 320 MHz, increase the maximum number of space-time streams from 8 to 16, and support multi-link operation and hybrid automatic repeat request (HARQ) operation.

However, there has been little discussion on communication apparatuses and methods for HARQ transmission in the context of EHT WLAN.

There is thus a need for communication apparatuses and methods that provide feasible technical solutions for HARQ transmission in the context of EHT WLAN, in order to provide better link adaptation and higher throughput over 11ax HE WLAN. Furthermore, other desirable features and characteristics will become apparent from the subsequent detailed description and the appended claims, taken in conjunction with the accompanying drawings and this background of the disclosure.

SUMMARY

Non-limiting and exemplary embodiments facilitate providing communication apparatuses and communication methods for HARQ transmission in context of EHT WLAN.

According to an embodiment of the present disclosure, there is provided a communication apparatus comprising: circuitry, which, in operation, generates a transmission signal that includes a data field, the data field carrying an aggregated medium access control protocol data unit (A-MPDU) that is segmented into one or more code block; and a transmitter which, in operation, transmits the transmission signal to another communication apparatus; and wherein the A-MPDU comprises one or more A-MPDU subframe that are mapped to the one or more code block, such that an A-MPDU subframe not soliciting immediate acknowledgement and an A-MPDU subframe soliciting immediate acknowledgement are not mapped into a single code block.

According to another embodiment of the present disclosure, there is provided a communication method comprising: generating a transmission signal that includes a data field, the data field carrying an A-MPDU that is segmented into one or more code block, wherein the A-MPDU comprises one or more A-MPDU subframe that are mapped to the one or more code block, such that an A-MPDU subframe not soliciting immediate acknowledgement and an A-MPDU subframe soliciting immediate acknowledgement are not mapped into a single code block; and transmitting the transmission signal.

It should be noted that general or specific embodiments may be implemented as an apparatus, a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

Embodiments of the disclosure will be better understood and readily apparent to one of ordinary skilled in the art from the following written description, by way of example only, and in conjunction with the drawings, in which:

FIG. 10 depicts a schematic diagram of trigger-based uplink MU communication between an AP and multiple STAs in a MIMO wireless network.

FIG. 8 shows an illustration of a BCC encoding process of a data field containing an initial transmission, the data field having a type 2 code block segmentation.

DETAILED DESCRIPTION

Figure 1A:
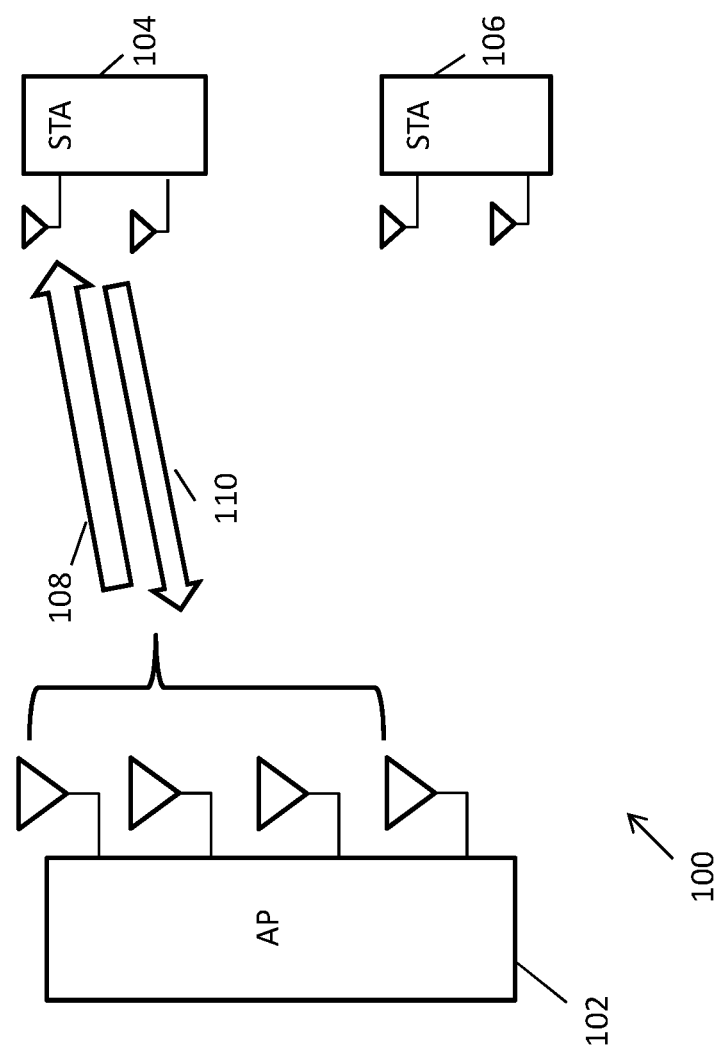
FIG. 1A depicts a schematic diagram of uplink and downlink single-user (SU) multiple input multiple output (MIMO) communication between an access point (AP) and a station (STA) in a MIMO wireless network.

Some embodiments of the present disclosure will be described, by way of example only, with reference to the drawings. Like reference numerals and characters in the drawings refer to like elements or equivalents.

In the following paragraphs, certain exemplifying embodiments are explained with reference to an access point (AP) and a station (STA) for hybrid automatic repeat request (HARQ) transmission, especially in a multiple-input multiple-output (MIMO) wireless network.

In the context of IEEE 802.11 (Wi-Fi) technologies, a station, which is interchangeably referred to as a STA, is a communication apparatus that has the capability to use the 802.11 protocol. Based on the IEEE 802.11-2016 definition, a STA can be any device that contains an IEEE 802.11-conformant media access control (MAC) and physical layer (PHY) interface to the wireless medium (WM).

For example, a STA may be a laptop, a desktop personal computer (PC), a personal digital assistant (PDA), an access point or a Wi-Fi phone in a wireless local area network (WLAN) environment. The STA may be fixed or mobile. In the WLAN environment, the terms "STA", "wireless client", "user", "user device", and "node" are often used interchangeably.

Likewise, an AP, which may be interchangeably referred to as a wireless access point (WAP) in the context of IEEE 802.11 (Wi-Fi) technologies, is a communication apparatus that allows STAs in a WLAN to connect to a wired network. The AP usually connects to a router (via a wired network) as a standalone device, but it can also be integrated with or employed in the router.

As mentioned above, a STA in a WLAN may work as an AP at a different occasion, and vice versa. This is because communication apparatuses in the context of IEEE 802.11 (Wi-Fi) technologies may include both STA hardware components and AP hardware components. In this manner, the communication apparatuses may switch between a STA mode and an AP mode, based on actual WLAN conditions and/or requirements.

In a MIMO wireless network, "multiple" refers to multiple antennas used simultaneously for transmission and multiple antennas used simultaneously for reception, over a radio channel. In this regard, "multiple-input" refers to multiple transmitter antennas, which input a radio signal into the channel, and "multiple-output" refers to multiple receiver antennas, which receive the radio signal from the channel and into the receiver. For example, in an N×M MIMO network system, N is the number of transmitter antennas, M is the number of receiver antennas, and N may or may not be equal to M. For the sake of simplicity, the respective numbers of transmitter antennas and receiver antennas are not discussed further in the present disclosure.

In a MIMO wireless network, single-user (SU) communications and multi-user (MU) communications can be deployed for communications between communication apparatuses such as APs and STAs. MIMO wireless network has benefits like spatial multiplexing and spatial diversity, which enable higher data rates and robustness through the use of multiple spatial streams. According to various embodiments, the term "spatial stream" may be used interchangeably with the term "space-time stream" (or STS).

FIG. 1A depicts a schematic diagram of SU communication 100 between an AP 102 and a STA 104 in a MIMO wireless network. As shown, the MIMO wireless network may include one or more STAs (e.g. STA 104, STA 106, etc.). If the SU communication 100 in a channel is carried out over whole channel bandwidth, it is called full bandwidth SU communication. If the SU communication 100 in a channel is carried out over a part of the channel bandwidth (e.g. one or more 20 MHz subchannels within the channel is punctured), it is called punctured SU communication. In the SU communication 100, the AP 102 transmits multiple space-time streams using multiple antennas (e.g. four antennas as shown in FIG. 1A) with all the space-time streams directed to a single communication apparatus, i.e. the STA 104. For the sake of simplicity, the multiple space-time streams directed to the STA 104 are illustrated as a grouped data transmission arrow 108 directed to the STA 104.

The SU communication 100 can be configured for bi-directional transmissions. As shown in FIG. 1A, in the SU communication 100, the STA 104 may transmit multiple space-time streams using multiple antennas (e.g. two antennas as shown in FIG. 1A) with all the space-time streams directed to the AP 102. For the sake of simplicity, the multiple space-time streams directed to the AP 102 are illustrated as a grouped data transmission arrow 110 directed to the AP 102.

As such, the SU communication 100 depicted in FIG. 1A enables both uplink and downlink SU transmissions in a MIMO wireless network.

Figure 1B:
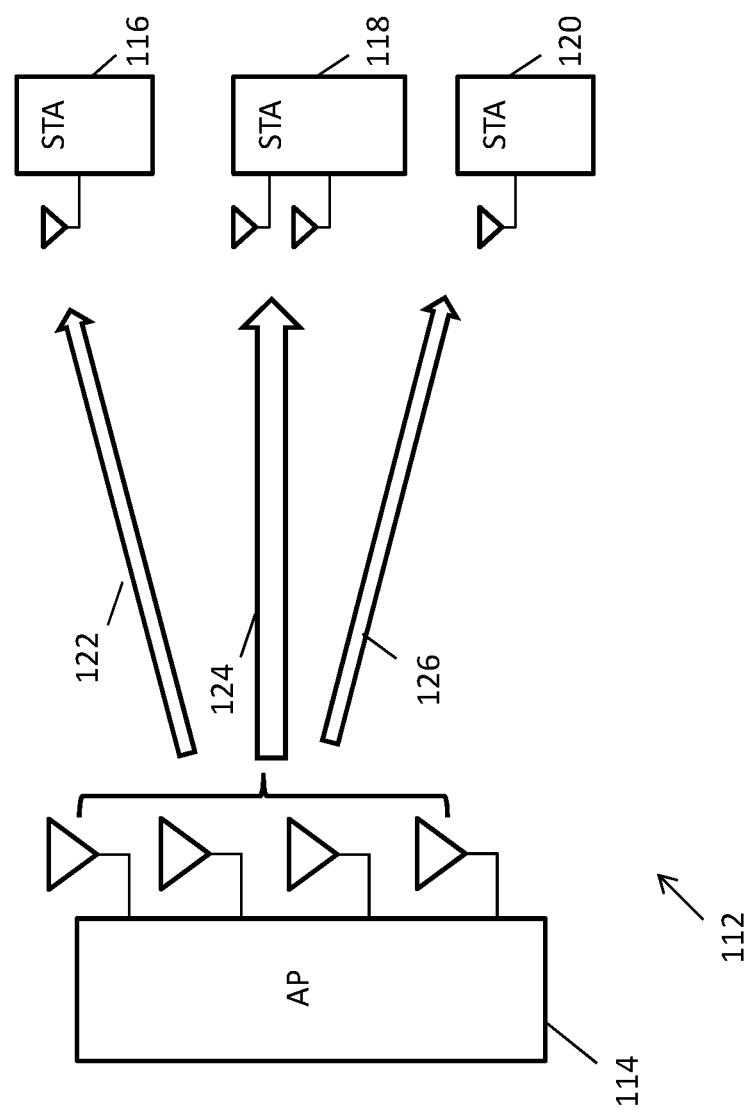
FIG. 1B depicts a schematic diagram of downlink multi-user (MU) communication between an AP and multiple STAs in a MIMO wireless network.
Figure 1C:
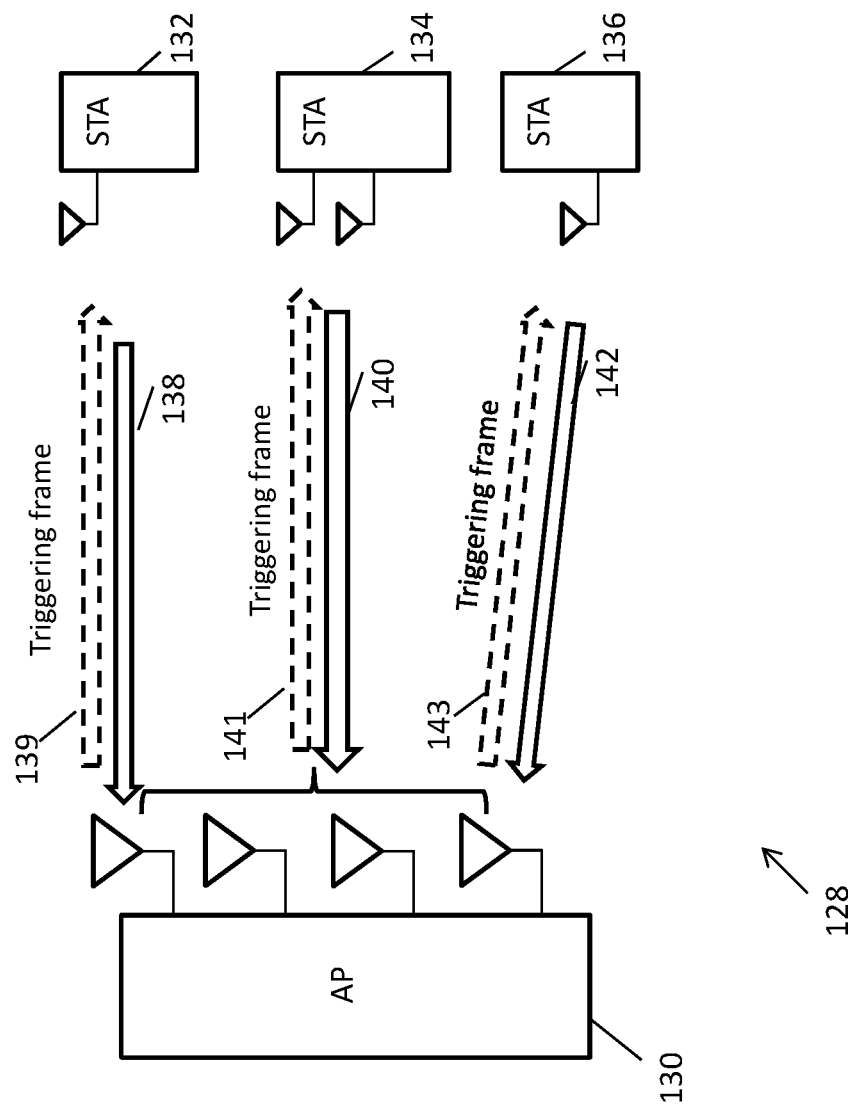
FIG. 1D depicts a schematic diagram of trigger-based downlink multi-AP communication between multiple APs and a STA in a MIMO wireless network.

FIG. 1B depicts a schematic diagram of downlink MU communication 112 between an AP 114 and multiple STAs 116, 118, 120 in a MIMO wireless network. The MIMO wireless network may include one or more STAs (e.g. STA 116, STA 118, STA 120, etc.). The MU communication 112 can be an OFDMA (orthogonal frequency division multiple access) communications or a MU-MIMO communication. For an OFDMA communication in a channel, the AP 114 transmits multiple streams simultaneously to the STAs 116, 118, 120 in the network at different resource units (RUs) within the channel bandwidth. For a MU-MIMO communication in a channel, the AP 114 transmits multiple streams simultaneously to the STAs 116, 118, 120 at same RU(s) within the channel bandwidth using multiple antennas via spatial mapping or precoding techniques. If the RU(s) at which the OFDMA or MU-MIMO communication occurs occupy whole channel bandwidth, the OFDMA or MU-MIMO communications is called full bandwidth OFDMA or MU-MIMO communications. If the RU(s) at which the OFDMA or MU-MIMO communication occurs occupy a part of channel bandwidth (e.g. one or more 20 MHz subchannel within the channel is punctured), the OFDMA or MU-MIMO communication is called punctured OFDMA or MU-MIMO communications. For example, two space-time streams may be directed to the STA 118, another space-time stream may be directed to the STA 116, and yet another space-time stream may be directed to the STA 120. For the sake of simplicity, the two space-time streams directed to the STA 118 are illustrated as a grouped data transmission arrow 124, the space-time stream directed to the STA 116 is illustrated as a data transmission arrow 122, and the space-time stream directed to the STA 120 is illustrated as a data transmission arrow 126.

To enable uplink MU transmissions, trigger-based communication is provided to the MIMO wireless network. In this regard, FIG. 1O depicts a schematic diagram of trigger-based uplink MU communication 128 between an AP 130 and multiple STAs 132, 134, 136 in a MIMO wireless network.

Since there are multiple STAs 132, 134, 136 participating in the trigger-based uplink MU communication, the AP 130 needs to coordinate simultaneous transmissions of multiple STAs 132, 134, 136.

To do so, as shown in FIG. 1O, the AP 130 transmits triggering frames 139, 141, 143 simultaneously to STAs 132, 134, 136 to indicate user-specific resource allocation information (e.g. the number of space-time streams, a starting STS number and the allocated RUs) each STA can use. In response to the triggering frames, STAs 132, 134, 136 may then transmit their respective space-time streams simultaneously to the AP 130 according to the user-specific resource allocation information indicated in the triggering frames 139, 141, 143. For example, two space-time streams may be directed to the AP 130 from STA 134, another space-time stream may be directed to the AP 130 from STA 132, and yet another space-time stream may be directed to the AP 130 from STA 136. For the sake of simplicity, the two space-time streams directed to the AP 130 from STA 134 are illustrated as a grouped data transmission arrow 140, the space-time stream directed to the AP 130 from STA 132 is illustrated as a data transmission arrow 138, and the space-time stream directed to the AP 130 from STA 136 is illustrated as a data transmission arrow 142.

Trigger-based communication is also provided to the MIMO wireless network to enable downlink multi-AP communication. In this regard, FIG. 1D depicts a schematic diagram of downlink multi-AP communication 144, between a STA 150 and multiple APs 146, 148 in a MIMO wireless network.

Since there are multiple APs 146, 148 participating in the trigger-based downlink multi-AP MIMO communication, the master AP 146 needs to coordinate simultaneous transmissions of multiple APs 146, 148.

Figure 1D:
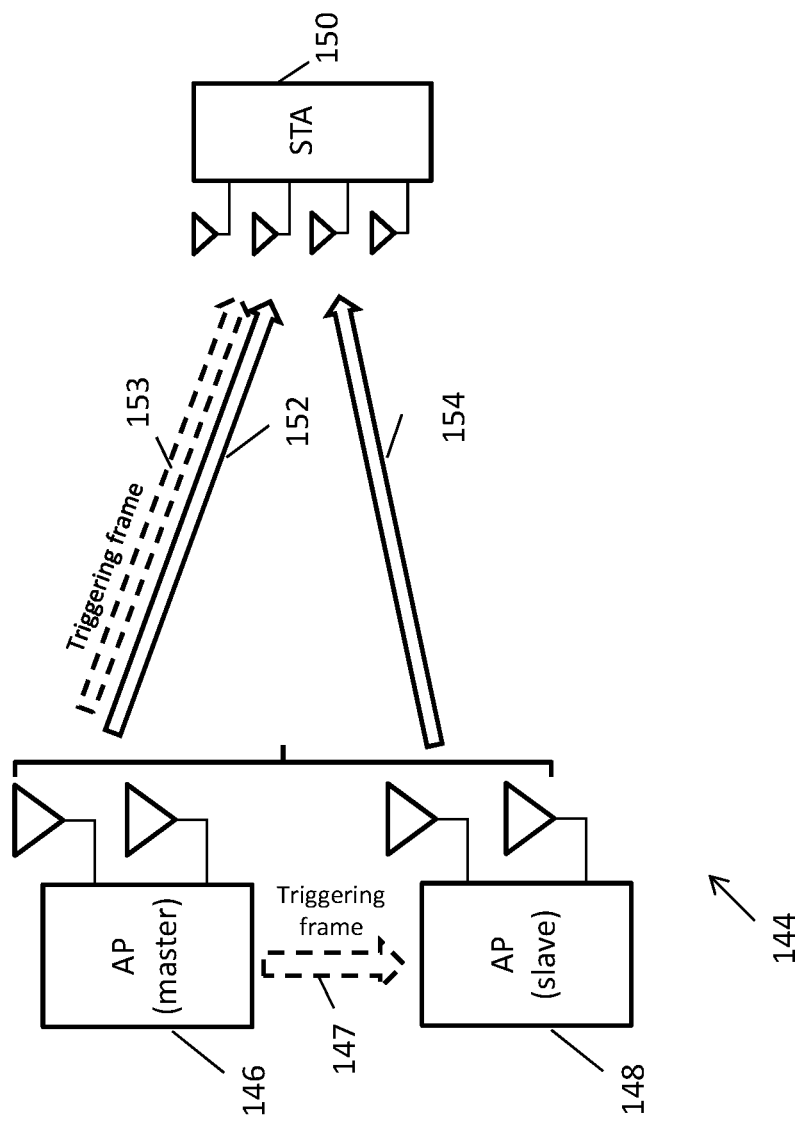

To do so, as shown in FIG. 1D, the master AP 146 transmits triggering frames 147, 153 simultaneously to the AP 148 and the STA 150 to indicate AP-specific resource allocation information (e.g. the number of space-time streams, a starting STS stream number and the allocated RUs) each AP can use. In response to the triggering frames, the multiple APs 146, 148 may then transmit respective space-time streams to the STA 150 according to the AP-specific resource allocation information indicated in the triggering frame 147; and the STA 150 may then receive all the space-time streams according to the AP-specific resource allocation information indicated in the triggering frame 153. For example, two space-time streams may be directed to the STA 150 from AP 146, and another two space-time streams may be directed to the STA 150 from AP 148. For the sake of simplicity, the two space-time streams directed to the STA 150 from AP 146 are illustrated as a grouped data transmission arrow 152, and the two space-time streams directed to the STA 150 from the AP 148 is illustrated as a grouped data transmission arrow 154.

Due to packet/PPDU (physical layer protocol data unit) based transmission and distributed MAC (medium access control) scheme in 802.11 WLAN, time scheduling (e.g. TDMA (time division multiple access)-like periodic time slot assignment for data transmission) does not exist in 802.11 WLAN. Frequency and spatial resource scheduling is performed on a packet basis. In other words, resource allocation information is on a PPDU basis.

According to various embodiments, it is possible for EHT WLAN to support hybrid automatic repeat request (HARQ) operation. HARQ operation provides a flexible mechanism for recovering from transmission errors, reduces the number of retransmission and provides a more efficient data flow result. In other words, HARQ operations in EHT WLAN can provide a better link adaptation and higher throughput.

However, there has been little discussion on HARQ transmission and retransmission for single user communications in context of 11be EHT WLAN. The present disclosure thus seeks to address the above-mentioned issue.

According to the present disclosure, an aggregated medium access control (MAC) protocol data unit (A-MPDU) carried in a data field of a transmission signal such as an EHT basic PPDU is segmented into one or more code block with a same size. An A-MPDU comprises one or more A-MPDU subframes, wherein an A-MPDU subframe may include a single MAC protocol data unit (MPDU). An A-MPDU subframe in an A-MPDU corresponds to one or more code block. More than one A-MPDU subframes in an A-MPDU may correspond to a single code block. In an A-MPDU, an A-MPDU subframe not soliciting immediate acknowledgement and an A-MPDU subframe soliciting immediate acknowledgement are not mapped into a single code block.

Further, according to the present disclosure, there are two types of code blocks, one requiring HARQ feedback and the other not requiring it. For a code block requiring HARQ feedback, the corresponding one or more MPDU (or equivalently the corresponding one or more A-MPDU subframe) in an A-MPDU solicit immediate acknowledgement. For a code block not requiring HARQ feedback, the corresponding one or more MPDU (or equivalently the corresponding one or more A-MPDU subframe) in an A-MPDU does not solicit immediate acknowledgement.

In terms of code block placement for an A-MPDU according to the present disclosure, A-MPDU subframes that solicit immediate acknowledgement are placed consecutively in an A-MPDU so that code blocks requiring HARQ feedback are numbered consecutively. A-MPDU subframes not soliciting immediate acknowledgement are placed before A-MPDU subframes soliciting immediate acknowledgement in an A-MPDU. Advantageously, code blocks requiring HARQ feedback can be indicated by a starting code block number and the number of code blocks requiring HARQ feedback; thus HARQ signaling overhead and HARQ feedback overhead may be reduced.

Five different types of code block segmentation (types 1, 2, 3, 4 and 5) for the A-MPDU are discussed. Type 1 code block segmentation comprises the following attributes. If an A-MPDU subframe corresponds to a single code block, for example when the size of the A-MPDU subframe is smaller than or equal to that of the code block, the code block is aligned with the boundary of the A-MPDU subframe. If an A-MPDU subframe corresponds to more than one code blocks, for example when a size of the A-MPDU subframe is larger than that of a code block, the last of the more than one code blocks is aligned with the boundary of the A-MPDU subframe. if more than one A-MPDU subframes correspond to a code block, for example when the size of the more than one A-MPDU subframes is smaller than or equal to that of the code block, the code block is aligned with the boundary of the last of the more than one A-MPDU subframes. Further, MAC layer needs to inform PHY layer of the size of each of A-MPDU subframes in an A-MPDU. An advantage of utilising type 1 code block segmentation is that the existing MPDU based acknowledgement mechanism can be reused for HARQ feedback. However, type 1 code block segmentation may be inefficient for transmission of an A-MPDU containing one or more large-size MPDU since all code blocks corresponding to each large-size MPDU with negative acknowledgement (NACK) need to be retransmitted.

Type 2 code block segmentation comprises the following attributes. If an A-MPDU subframe corresponds to a single code block, for example when the size of the A-MPDU subframe is smaller than or equal to that of the code block, the code block is aligned with the boundary of the A-MPDU subframe. If an A-MPDU subframe corresponds to more than one code blocks, for example when a size of the A-MPDU subframe is larger than that of a code block, the last of the more than one code blocks is aligned with the boundary of the A-MPDU subframe. If more than one A-MPDU subframes correspond to a code block, for example when the size of the more than one A-MPDU subframes is smaller than or equal to that of the code block, the code block is aligned with the boundary of the last of the more than one A-MPDU subframes. Each of code blocks requiring HARQ feedback is attached with a cyclic redundancy check (CRC). Further, the MAC layer needs to inform PHY layer of the size of each of A-MPDU subframes in an A-MPDU, as well as inform the PHY layer of the total size of A-MPDU subframes not soliciting immediate acknowledgement in an A-MPDU. Advantageously, type 2 code block segmentation may be efficient for transmission of an A-MPDU containing one or more large-size MPDU since only a part of code blocks with NACK corresponding to each large-size MPDU needs to be retransmitted. However, code block based HARQ feedback mechanism needs to be developed since existing MPDU based acknowledgement mechanism for HARQ feedback cannot be reused for type 2 code block segmentation.

Type 3 code block segmentation comprises the following attributes. A-MPDU subframes not soliciting immediate acknowledgement correspond to one or more code block not requiring HARQ feedback, wherein the last of the one or more code block not requiring HARQ feedback is aligned with the boundary of the last A-MPDU subframe not soliciting immediate acknowledgement. If an A-MPDU subframe soliciting immediate acknowledgement correspond to a single code block requiring HARQ feedback, the code block requiring HARQ feedback is aligned with the boundary of the A-MPDU subframe soliciting immediate acknowledgement. If an A-MPDU subframe soliciting immediate acknowledgement correspond to more than one code blocks requiring HARQ feedback, the last of the more than one code blocks requiring HARQ feedback is aligned with the boundary of the A-MPDU subframe soliciting immediate acknowledgement. If more than one A-MPDU subframes soliciting immediate acknowledgement correspond to a single code block requiring HARQ feedback, the code block requiring HARQ feedback is aligned with the boundary of the last of the more than one A-MPDU subframes soliciting immediate acknowledgement. Further, the MAC layer needs to inform PHY layer of the total size of A-MPDU subframes not soliciting immediate acknowledgement in an A-MPDU, as well as inform PHY layer of the size of each of A-MPDU subframes soliciting immediate acknowledgement in an A-MPDU. Advantageously, type 3 code block segmentation is similar to type 1 code block segmentation except less code blocks may be required for an A-MPDU than type 1 code block segmentation. However, similar to type 1, type 3 code block segmentation may be inefficient for transmission of an A-MPDU containing one or more large-size MPDU since all code blocks corresponding to each large-size MPDU with NACK need to be retransmitted.

Type 4 code block segmentation comprises the following attributes. A-MPDU subframes not soliciting immediate acknowledgement correspond to one or more code block not requiring HARQ feedback, the last of the one or more code block not requiring HARQ feedback is aligned with the boundary of the last A-MPDU subframe not soliciting immediate acknowledgement. If an A-MPDU subframe soliciting immediate acknowledgement corresponds to a single code block requiring HARQ feedback, the code block requiring HARQ feedback is aligned with the boundary of the A-MPDU subframe soliciting immediate acknowledgement. If an A-MPDU subframe soliciting immediate acknowledgement correspond to more than one code blocks requiring HARQ feedback, the last of the more than one code blocks requiring HARQ feedback is aligned with the boundary of the A-MPDU subframe soliciting immediate acknowledgement. If more than one A-MPDU subframes soliciting immediate acknowledgement correspond to a single code block requiring HARQ feedback, the code block requiring HARQ feedback is aligned with the boundary of the last of the more than one A-MPDU subframes soliciting immediate acknowledgement. Each of code blocks requiring HARQ feedback is attached with a CRC. Further, the MAC layer needs to inform PHY layer of the total size of A-MPDU subframes not soliciting immediate acknowledgement in an A-MPDU, as well as inform PHY layer of the size of each of A-MPDU subframes soliciting immediate acknowledgement in an A-MPDU. Advantageously, type 4 code block segmentation is similar to type 2 code block segmentation except less code blocks may be required for an A-MPDU than type 2 code block segmentation. However, similar to type 2, code block based HARQ feedback mechanism needs to be developed since existing MPDU based acknowledgement mechanism for HARQ feedback cannot be reused for type 4 code block segmentation.

Type 5 code block segmentation comprises the following attributes. A-MPDU subframes not soliciting immediate acknowledgement correspond to one or more code block not requiring HARQ feedback, the last of the one or more code block not requiring HARQ feedback is aligned with the boundary of the last A-MPDU subframe not soliciting immediate acknowledgement. A-MPDU subframes soliciting immediate acknowledgement correspond to one or more code block requiring HARQ feedback, the last of the one or more code block requiring HARQ feedback is aligned with the boundary of the last A-MPDU subframe soliciting immediate acknowledgement. Each of code blocks requiring HARQ feedback is attached with a CRC. Further, the MAC layer needs to inform PHY layer of the total size of A-MPDU subframes not soliciting immediate acknowledgement in an A-MPDU, as well as inform PHY layer of the total size of A-MPDU subframes soliciting immediate acknowledgement in an A-MPDU. Advantageously, type 5 code block segmentation is similar to type 4 code block segmentation except less code blocks may be required for an A-MPDU than type 4 code block segmentation. However, similar to type 4, code block based HARQ feedback mechanism needs to be developed since existing MPDU based acknowledgement mechanism for HARQ feedback cannot be reused for type 5 code block segmentation.

Figure 2:
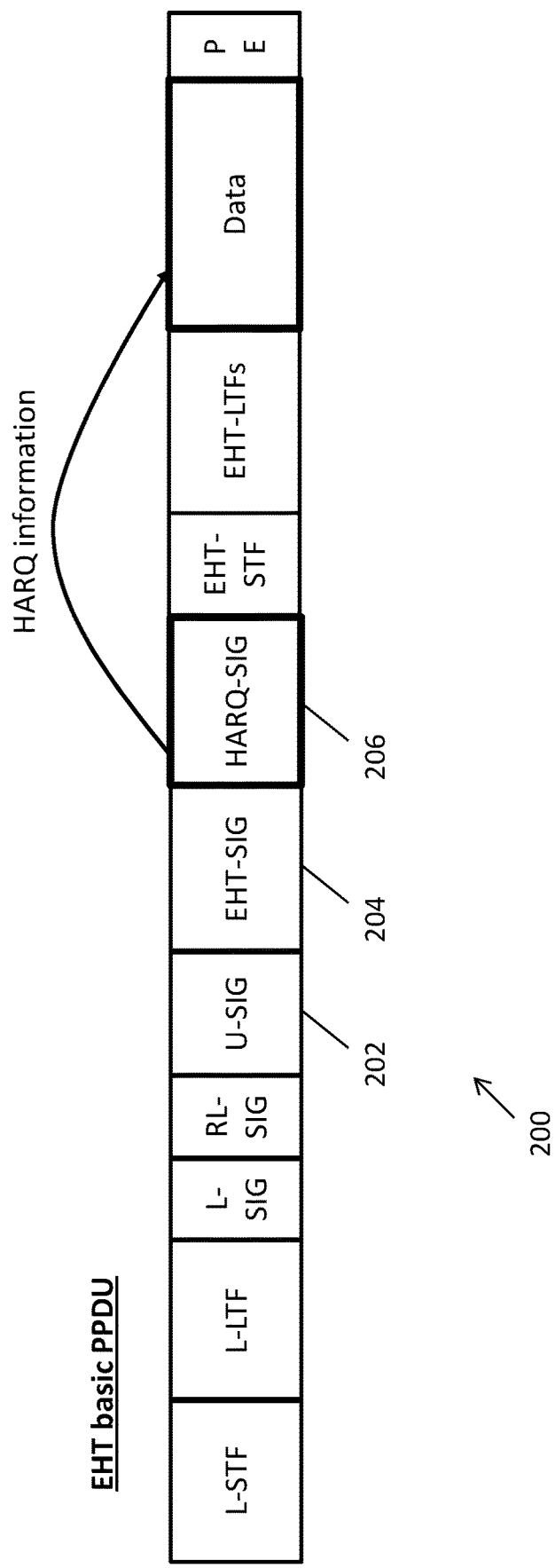
FIG. 2 shows a format of an EHT basic physical layer protocol data unit (PPDU) according to various embodiments of the present disclosure.

According to the present disclosure, an EHT basic PPDU can be used for non-trigger-based communications. FIG. 2 shows a format of an EHT basic PPDU 200 according to various embodiments of the present disclosure. The PPDU 200 may include a non-High Throughput Short Training Field (L-STF), a non-High Throughput Long Training Field (L-LTF), a non-High Throughput SIGNAL (L-SIG) field, a Repeated L-SIG (RL-SIG) field, a Universal SIGNAL (U-SIG) field 202, an EHT SIGNAL (EHT-SIG) field 204, a HARQ SIGNAL (HARQ-SIG) field 206, an EHT Short Training Field (EHT-STF), an EHT Long Training Field (EHT-LTF), a data field and a Packet Extension (PE) field. The PPDU may be transmitted as a transmission signal by a communication apparatus (such as an AP or STA) to another communication apparatus (such as an AP or STA).

In the PPDU 200 transmitted to a single STA, a single A-MPDU is carried in the data field. The U-SIG field 202 indicates whether HARQ operation is enabled for the PPDU 200. If the U-SIG field 202 indicates that HARQ operation is disabled for the PPDU 200, the HARQ-SIG field 206 may not be present in the PPDU 200. HARQ operation shall be disabled for the PPDU 200 if the intended STA does not support HARQ operation, or the A-MPDU carried in the data field does not include any MPDU that solicits immediate acknowledgement.

The HARQ-SIG field 206 provides HARQ operation related information regarding the data field. The HARQ operation related information includes whether initial transmission or retransmission is included in the PPDU 200, indication of code blocks which require HARQ feedback (for initial transmission only), code block segmentation type, code block size, HARQ type (i.e. whether HARQ incremental redundancy (IR) scheme is used or HARQ chase combining (CC) scheme is used), HARQ feedback type (i.e. MAC frame based feedback or null data packet (NDP) based feedback), puncturing pattern if HARQ CC scheme is used, and redundancy version if HARD IR scheme is used. It should be noted that the code block size (i.e. the number of bits per code block) is independent of modulation and coding scheme (MCS) applied to the data field, which is indicated in the U-SIG field 202 or the EHT-SIG field 204.

For both HARQ CC and HARQ IR schemes, all code blocks for an A-MPDU are transmitted in an initial transmission, and only code blocks with NACK are transmitted in a retransmission. HARQ CC scheme is categorised into two types: HARQ regular CC and HARQ punctured CC. HARQ regular CC can be treated as a special case of HARQ punctured CC, such the puncturing pattern for HARQ CC indicates no puncturing for the case of HARQ regular CC. For an initial transmission, all encoded bits in each code block are transmitted. For a code block requiring retransmission, retransmitted bits may be determined according to a puncturing pattern indicated in the HARQ-SIG field 206. For HARQ IR scheme, each code block is encoded using a mother code rate (e.g. ½). In an initial transmission or retransmission, for a code block, transmitted bits are extracted from the coded bits according to a redundancy version indicated in the HARQ-SIG field 206.

Figure 3:
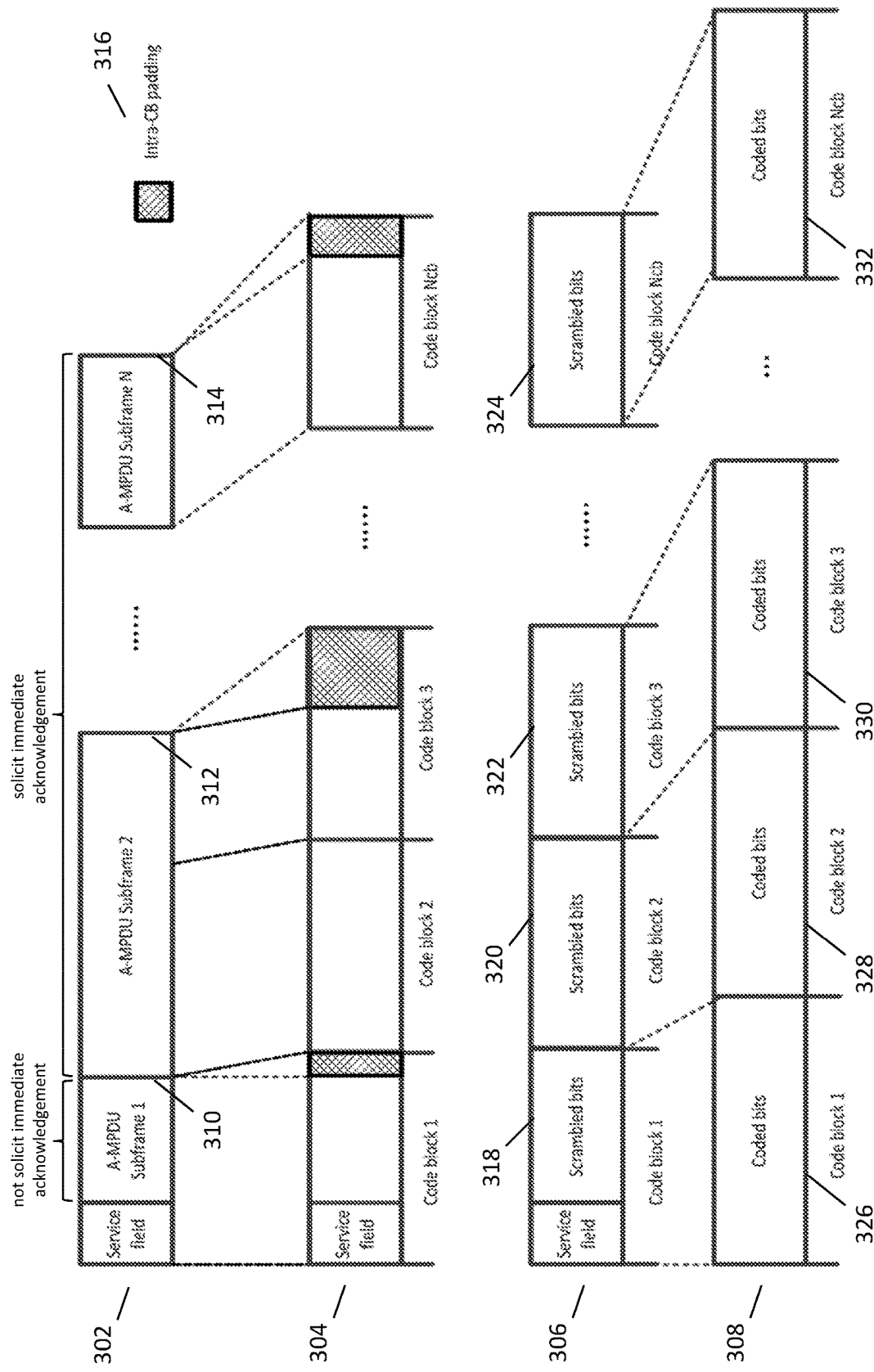
FIG. 3 shows an illustration of a low density parity check (LDPC) encoding process of a data field containing an initial transmission, the data field having a type 1 code block segmentation.

FIG. 3 shows an illustration 300 of a low density parity check (LDPC) encoding process of a data field 302 containing an initial transmission, the data field having a type 1 code block segmentation. The data field 302 may be in the format of the data field in the PPDU 200, and may include a service field followed by an A-MPDU comprising one or more A-MPDU subframes, i.e. A-MPDU subframe 1, A-MPDU subframe 2 up to A-MPDU subframe N, such that the A-MPDU is prepended by the service field. An A-MPDU subframe includes at most one MPDU. The A-MPDU subframe 1 does not solicit immediate acknowledgement and is placed in the data field 302 before the A-MPDU subframes 2 up to N that solicit immediate acknowledgement. Advantageously, code blocks requiring HARQ feedback can be indicated by a starting code block number and the number of code blocks requiring HARQ feedback; thus HARQ signaling overhead and HARQ feedback overhead may be reduced.

During code block (CB) segmentation 304, the A-MPDU subframes 1, 2 up to N are segmented into one or more code blocks. For example, A-MPDU subframe 1 is mapped to code block 1, A-MPDU subframe 2 is segmented/mapped to code block 2 and code block 3, and A-MPDU subframe N is mapped to code block $N_{CB}$. Each code block 1, 2 up to N has a same code block size, and may contain whole or part of a single A-MPDU subframe. The first code block, i.e. code block 1, may further contain the service field. The code block 2 may contain only part of the A-MPDU subframe 2. In type 1 code block segmentation, if an A-MPDU subframe corresponds to a single code block, for example when the size of the A-MPDU subframe is smaller than or equal to that of the code block, the code block is aligned with the boundary of the A-MPDU subframe. When an A-MPDU subframe corresponds to more than one code blocks, for example when a size of the A-MPDU subframe is larger than that of a code block, the last of the more than one code blocks is aligned with the boundary of the A-MPDU subframe. If more than one A-MPDU subframes correspond to a code block, for example when the size of the more than one A-MPDU subframes is smaller than or equal to that of the code block, the code block is aligned with the boundary of the last of the more than one A-MPDU subframes. Further, the MAC layer needs to inform PHY layer of the size of each of A-MPDU subframes in an A-MPDU. Therefore, code blocks 1, 3 and $N_{CB}$ align with A-MPDU subframe boundaries 310, 312 and 314 respectively. Intra-CB padding bits 316 may be appended to each of the code blocks 1, 3 and $N_{CB}$ which are aligned with A-MPDU subframe boundaries 310, 312 and 314 to fill up the code blocks 1, 3 and $N_{CB}$ to the code block size. It should be noted that the intra-padding bits 316 which are applied to the last code block $N_{CB}$ absorb pre-FEC padding bits so that the last code block is also aligned with symbol segment boundary in the last OFDM symbol (in case of no space-time block code (STBC) applied to the data field) or in the last two OFDM symbols (in case of STBC applied to the data field). The pre-FEC padding bits and symbol segments are defined in IEEE P802.11ax™/D6.1.

After CB segmentation 304, the code blocks undergo scrambling per code block process 306 such that A-MPDU subframe bits and intra-padding bits (if any) contained in each code block are scrambled. For example, after the scrambling process 306, code block 1 comprises the service field and scrambled bits 318, code block 2 comprises scrambled bits 320, code block 3 comprises scrambled bits 322 and code block $N_{CB}$ comprises scrambled bits 324. The initial state of each scrambling is the same with the first scrambling, which is the first N bits of the service field where N is a determined positive integer (e.g. 7 or 11). Further, these scrambled code blocks undergo LDPC coding 308 so that the contents of each code block are encoded using LDPC. For code block 1, the scrambled bits and service field are encoded using LDPC. For example, after LDPC coding process 308, code block 1 comprises coded bits 326, code block 2 comprises coded bits 328, code block 3 comprises coded bits 330 and code block $N_{CB}$ comprises coded bits 332. Thereafter, remaining transmitter processing for the encoded code blocks is the same as 11ax HE SU PPDU defined in IEEE P802.11ax™/D6.1.

Figure 4:
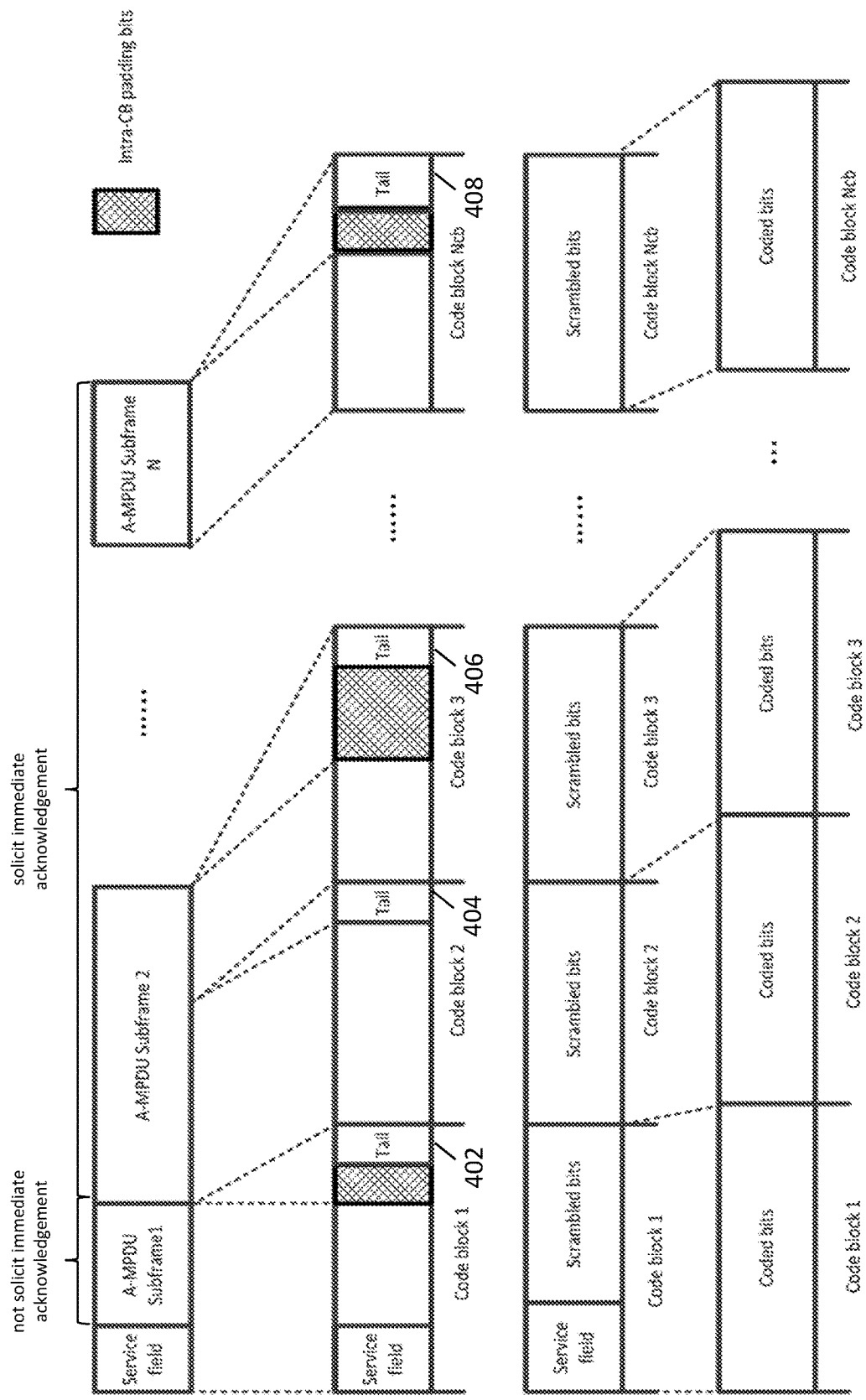
FIG. 4 shows an illustration of a binary convolutional code (BCC) encoding process of a data field containing an initial transmission, the data field having a type 1 code block segmentation.

FIG. 4 shows an illustration 400 of a binary convolutional code (BCC) encoding process of a data field containing an initial transmission, the data field having a type 1 code block segmentation. While the process for BCC encoding is similar to that shown in illustration 300, tail bits are appended at the end of each code block. For example, tail bits 402, 404, 406 and 408 are appended at the end of code block 1, code block 2, code block 3 and code block $N_{CB}$ respectively. Thereafter, the code blocks undergo scrambling per code block such that A-MPDU subframe bits, intra-padding bits (if any) and tail bit contained in each code block are scrambled. These scrambled code blocks then undergo BCC coding so that the contents of each code block are encoded using BCC.

Figure 5:
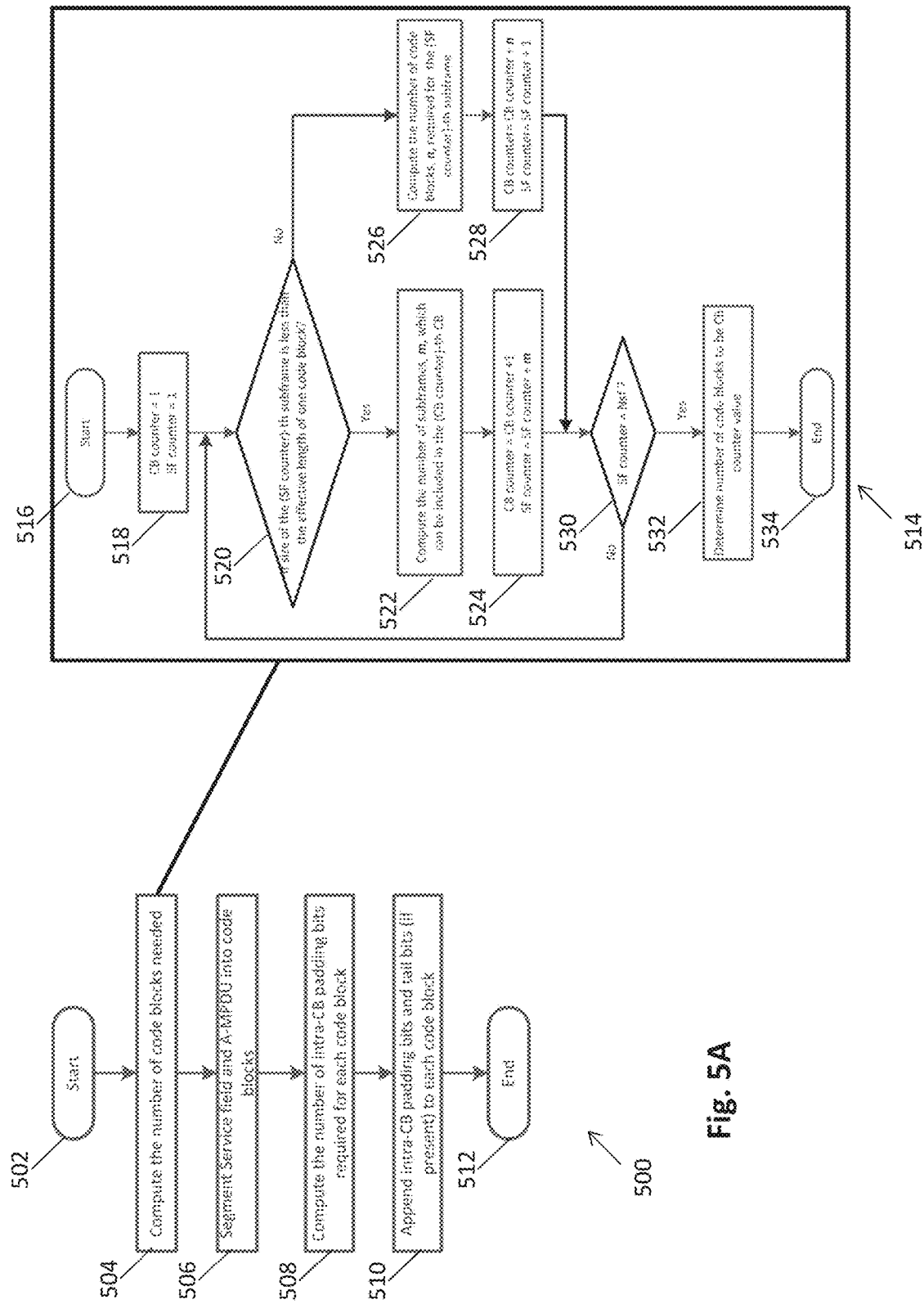
FIG. 5A shows a flowchart for type 1 code block segmentation.
FIG. 5B shows a flowchart for computing number of code blocks for type 1 code block segmentation.

FIG. 5A shows a flowchart 500 for type 1 code block segmentation as depicted in FIGS. 3 and 4. The process starts at step 502. At step 504, the number of code blocks needed is computed. At step 506, the service field and A-MPDU are segmented into code blocks. At step 508, the number of intra-CB padding bits required for each code block is computed. At step 510, intra-CB padding bits and tail bits (in the case of BCC encoding process as illustrated in FIG. 4) are appended to each code block. The process then ends at step 512. The process of how the number of code blocks needed is computed at step 504 is shown in more detail in flowchart 514 of FIG. 5B. The process of flowchart 514 to compute the number of code blocks needed starts from step 516. At step 518, a CB counter and subframe (SF) counter are both set to 1. At step 520, it is determined whether the size of the (SF counter)-th subframe is less than the effective length of one code block. The effective length of a code block is the size of a code block excluding service field (in case of the first code block) and tail bits (in case of BCC coding). If it is determined that size of the (SF counter)-th subframe is not less than the effective length of one code block, the process proceeds to step 526 wherein the number of code blocks, n, required for the (SF counter)-th subframe is computed. At step 528, the CB counter is incremented by n and the SF counter is incremented by 1. At step 530, it is determined whether the SF counter has reached a value that is equal to $N_{SF}$ i.e. the total number of A-MPDU subframes in the A-MPDU. If it is determined that the value of the SF counter is not equal to $N_{SF}$, the process goes back to step 520. On the other hand, if it is determined at step 520 that the size of the (SF counter)-th subframe is less than the effective length of one code block, the process proceeds from step 520 to step 522 where the number of subframes, m, which can be included in the (CB counter)-th code block is computed. At step 524, the CB counter is incremented by 1 and the SF counter is incremented by m. The process then proceeds to step 530, where the loop process between step 520 and step 530 continues until the SF counter value is equal to $N_{SF}$. Then the process proceeds to step 532 where the number of code blocks needed (i.e. the final value of the CB counter) is determined. The process then ends at step 534.

Figure 6:
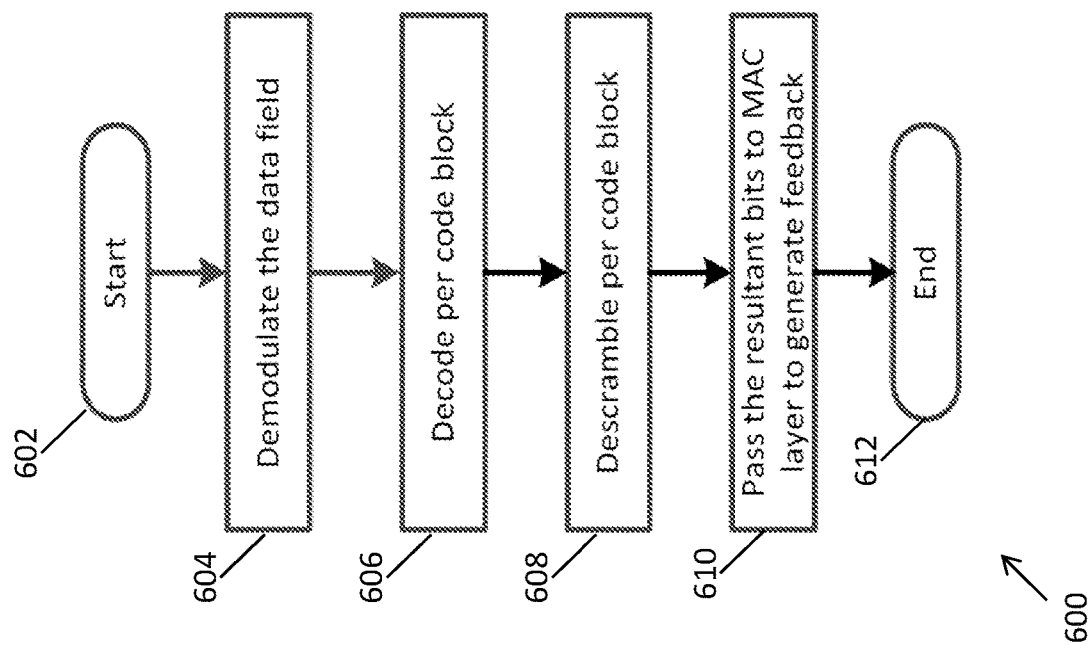
FIG. 6 shows a flowchart for STA behaviour under type 1 code block segmentation.

FIG. 6 shows a flowchart 600 for STA behaviour under type 1 code block segmentation (i.e. behaviour of an intended STA that receives the encoded code blocks shown in FIG. 3 and FIG. 4). The process begins from step 602. At step 604, the data field is demodulated. At step 606, each code block is decoded. At step 608, each code block is descrambled. At step 610, the resultant bits obtained from descrambling the code blocks are passed to the MAC layer to generate feedback. The process then ends at step 612.

Advantageously for type 1 code block segmentation, the existing MPDU based acknowledgement mechanism can be reused for HARQ feedback. However, type 1 code block segmentation may be inefficient for transmission of an A-MPDU containing one or more large-size MPDU (a maximum size of 11454 octets) as all code blocks corresponding to each large-size MPDU with NACK needs to be retransmitted.

Figure 7:
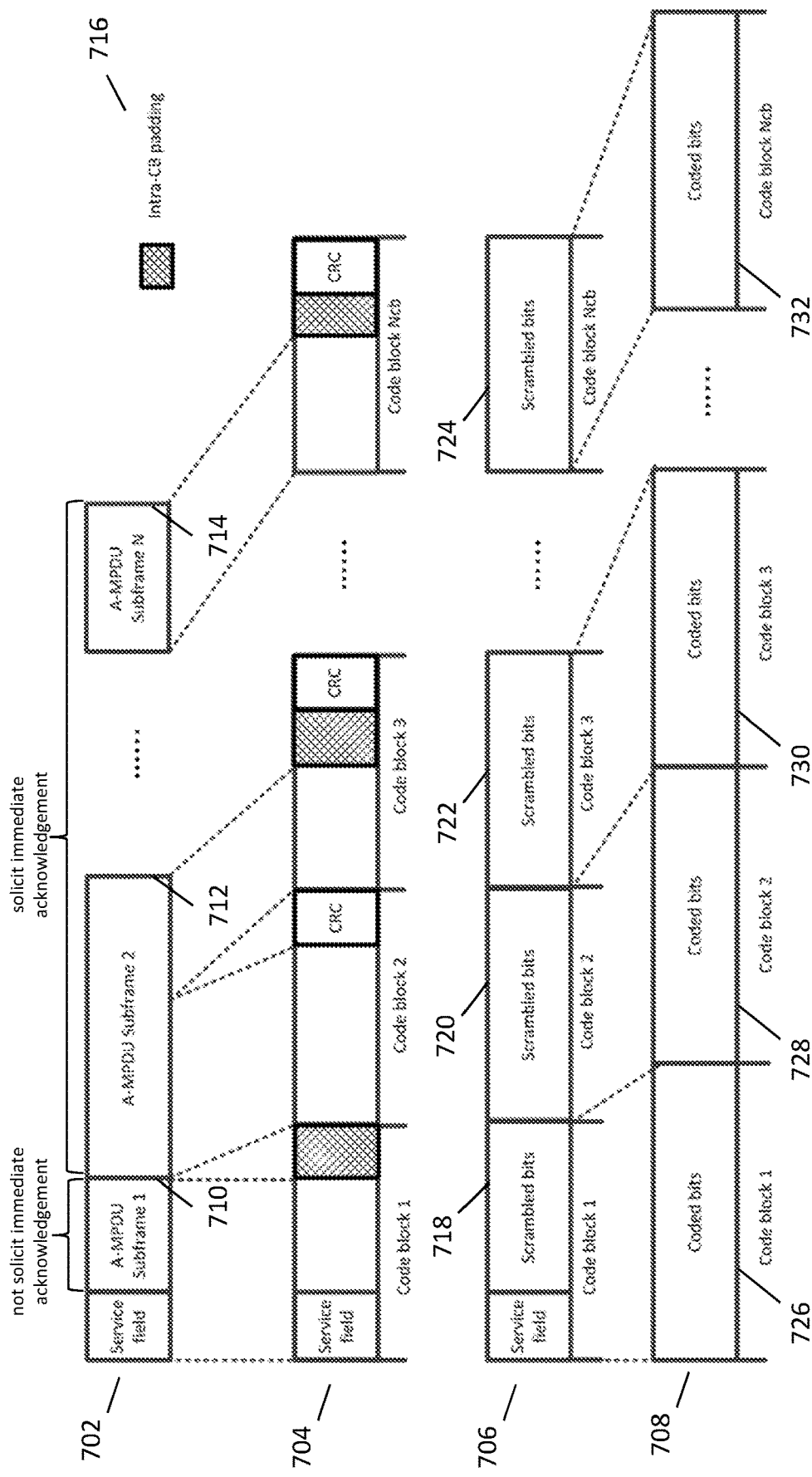
FIG. 7 shows an illustration of a LDPC encoding process of a data field containing an initial transmission, the data field having a type 2 code block segmentation.

FIG. 7 shows an illustration 700 of a LDPC encoding process of a data field 702 containing an initial transmission, the data field having a type 2 code block segmentation. The data field 702 may be in the format of the data field in the PPDU 200, and may include a service field followed by an A-MPDU comprising one or more A-MPDU subframes, i.e. A-MPDU subframe 1, A-MPDU subframe 2 up to A-MPDU subframe N. An A-MPDU subframe includes at most one MPDU. The A-MPDU subframe 1 does not solicit immediate acknowledgement and is placed in the data field 702 before the A-MPDU subframes 2 up to N that solicit immediate acknowledgement. Advantageously, code blocks requiring HARQ feedback can be indicated by a starting code block number and the number of code blocks requiring HARQ feedback; thus HARQ signaling overhead and HARQ feedback overhead may be reduced.

During CB segmentation 704, the A-MPDU subframes 1, 2 up to N are segmented into one or more code blocks. For example, A-MPDU subframe 1 is mapped to code block 1, A-MPDU subframe 2 is segmented/mapped to code block 2 and code block 3, and A-MPDU subframe N is mapped to code block $N_{CB}$. Each code block 1, 2 up to N has a same code block size, and may contain whole or part of a single A-MPDU subframe. The first code block i.e. code block 1 may further contain the service field. The code block 2 may contain only part of the A-MPDU subframe 2. In type 2 code block segmentation, if an A-MPDU subframe corresponds to a single code block, for example when the size of the A-MPDU subframe is smaller than or equal to that of the code block, the code block is aligned with the boundary of the A-MPDU subframe. If an A-MPDU subframe corresponds to more than one code blocks, for example when a size of the A-MPDU subframe is larger than that of a code block, the last of the more than one code blocks is aligned with the boundary of the A-MPDU subframe. If more than one A-MPDU subframes correspond to a code block, for example when the size of the more than one A-MPDU subframes is smaller than or equal to that of the code block, the code block is aligned with the boundary of the last of the more than one A-MPDU subframes. Each of code blocks requiring HARQ feedback is attached with a CRC. Further, the MAC layer needs to inform PHY layer of the size of each of A-MPDU subframes in an A-MPDU, as well as inform PHY layer of the total size of A-MPDU subframes not soliciting immediate acknowledgement in an A-MPDU. Therefore, the code blocks 1, 3 and $N_{CB}$ align with A-MPDU subframe boundaries 710, 712 and 714 respectively. Intra-CB padding bits 716 may be appended to each of the code blocks 1, 3 and $N_{CB}$ which are aligned with A-MPDU subframe boundaries 710, 712 and 714 to fill up the code blocks 1, 3 and $N_{CB}$ to the code block size. It should be noted that the intra-padding bits 716 which are applied to the last code block $N_{CB}$ absorb pre-FEC padding bits so that the last code block is also aligned with symbol segment boundary in the last OFDM symbol (in case of no STBC applied to the data field) or in the last two OFDM symbols (in case of STBC applied to the data field). CRC is appended to each code block that requires HARQ feedback, i.e. each of code blocks 2 up to N corresponding to A-MPDU subframes 2 up to N that solicits immediate acknowledgement.

After CB segmentation 704, the code blocks undergo scrambling per code block process 706 such that A-MPDU subframe bits, intra-padding bits (if any) and CRC (if any) contained in each code block are scrambled. For example, after the scrambling process 706, code block 1 comprises the service field and scrambled bits 718, code block 2 comprises scrambled bits 720, code block 3 comprises scrambled bits 722 and code block $N_{CB}$ comprises scrambled bits 724. The initial state of each scrambling is the same with the first scrambling, which is the first N bits of the service field where N is a determined positive integer (e.g. 7 or 11). Further, these scrambled code blocks undergo LDPC coding process 708 so that the contents of each code block are encoded using LDPC. For code block 1, the scrambled bits and service field are encoded using LDPC. For example, after LDPC coding process 708, code block 1 comprises coded bits 726, code block 2 comprises coded bits 728, code block 3 comprises coded bits 730 and code block $N_{CB}$ comprises coded bits 732. The remaining transmitter processing is the same as 11ax HE SU PPDU.

FIG. 8 shows an illustration 800 of a BCC encoding process of a data field containing an initial transmission, the data field having a type 2 code block segmentation. While the process for BCC encoding is similar to that shown in illustration 700, tail bits are appended at the end of each code block. For example, tail bits 802, 804, 806, 808 and 810 are appended at the end of code block 1, code block 2, code block 3, code block 4 and code block $N_{CB}$ respectively. Thereafter, the code blocks undergo scrambling per code block such that A-MPDU subframe bits, intra-padding bits (if any), CRC bits (if any) and tail bits contained in each code block are scrambled. These scrambled code blocks then undergo BCC coding so that the contents of each code block are encoded using BCC.

Figures 9A, 9B:
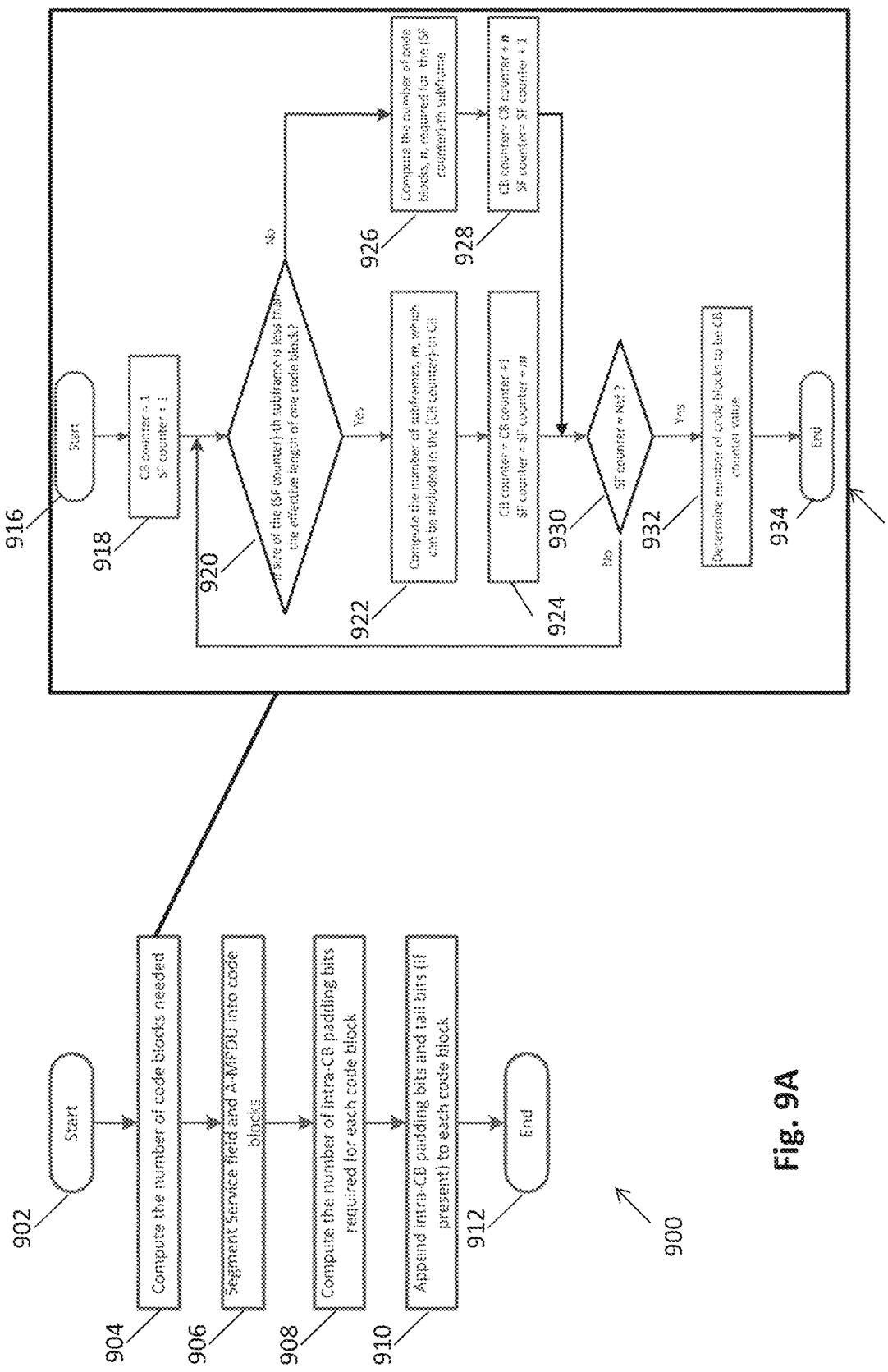
FIG. 9A shows a flowchart for type 2 code block segmentation.
FIG. 9B shows a flowchart for computing number of code blocks for type 2 code block segmentation.

FIG. 9A shows a flowchart 900 for type 2 code block segmentation as depicted in FIGS. 7 and 8. The process starts at step 902. At step 904, the number of code blocks needed is computed. At step 906, the service field and A-MPDU are segmented into code blocks. At step 908, the number of intra-CB padding bits required for each code block is computed. At step 910, intra-CB padding bits and tail bits (in the case of BCC encoding process as illustrated in FIG. 8) are appended to each code block. The process then ends at step 912. The process of how the number of code blocks needed is computed at step 904 is shown in more detail in flowchart 914 of FIG. 9B. The process of flowchart 914 to compute the number of code blocks needed starts from step 916. At step 918, a CB counter and SF counter are both set to 1. At step 920, it is determined whether the size of the (SF counter)-th subframe is less than the effective length of one code block. For a code block requiring HARQ feedback, the effective length is the size of the code block excluding CRC, service field (in case of the first code block) and tail bits (in case of BCC coding). For a code block not requiring HARQ feedback, the effective length is the size of the code block excluding service field (in case of the first code block) and tail bits (in case of BCC coding). If it is determined that size of the (SF counter)-th subframe is not less than the effective length of one code block, the process proceeds to step 926 wherein the number of code blocks, n, required for the (SF counter)-th subframe is computed. At step 928, the CB counter is incremented by n and the SF counter is incremented by 1. At step 930, it is determined whether the SF counter has reached a value that is equal to $N_{SF}$ i.e. the total number of A-MPDU subframes in the A-MPDU. If it is determined that the value of the SF counter is not equal to $N_{SF}$, the process goes back to step 920. On the other hand, if it is determined at step 920 that the size of the (SF counter)-th subframe is less than the effective length of one code block, the process proceeds from step 920 to step 922 where the number of subframes, m, which can be included in the (CB counter)-th code block is computed. If, at step 922, no more than one A-MPDU subframe can be mapped to a single code block, then m=1. At step 924, the CB counter is incremented by 1 and the SF counter is incremented by m. The process then proceeds to step 930, where the loop process between step 920 and step 930 continues until the SF counter value is equal to $N_{SF}$. Then the process proceeds to step 932 where the number of code blocks needed (i.e. the final value of the CB counter) is determined. The process then ends at step 934.

Figures 10A, 10B:
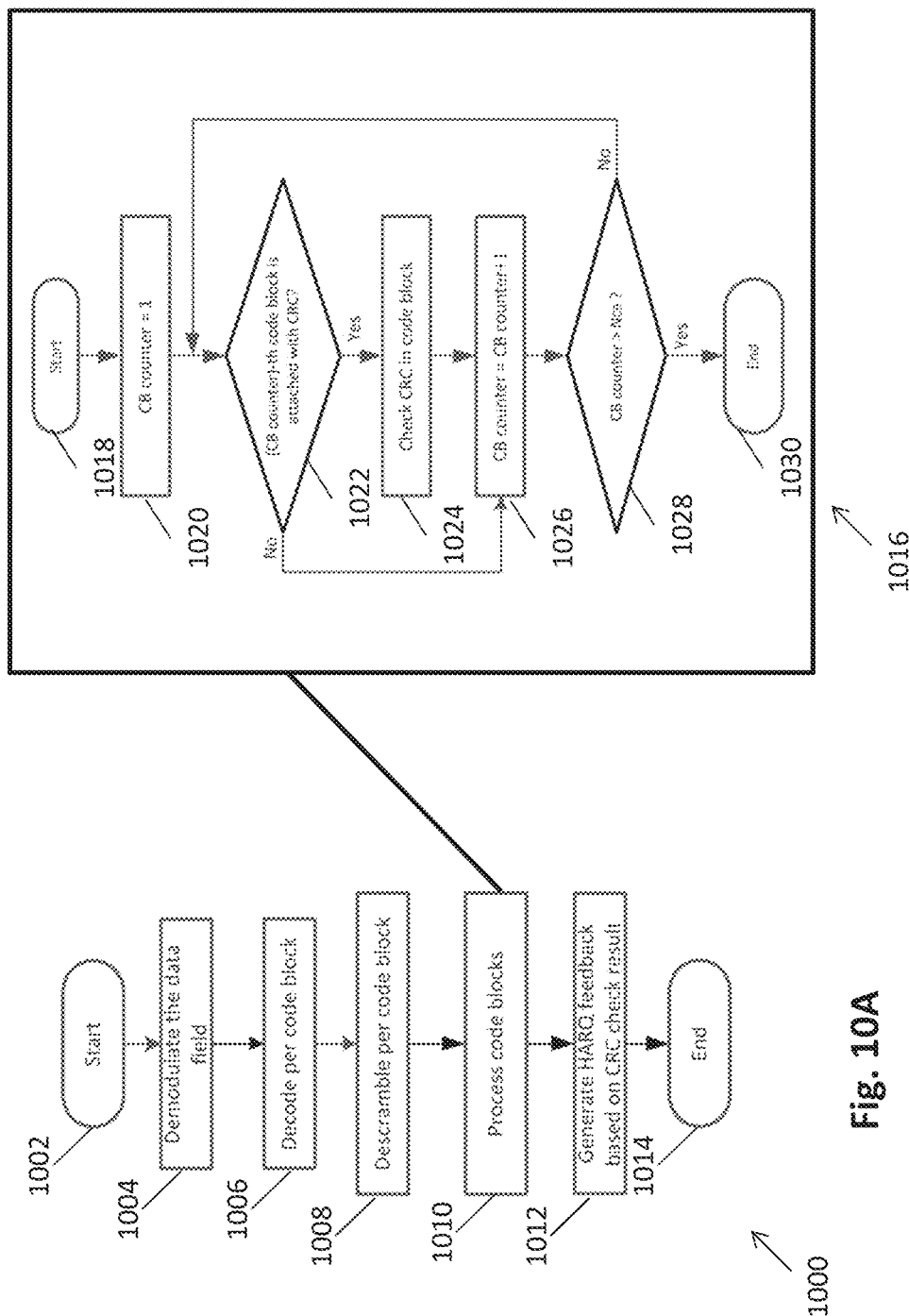
FIG. 10A shows a flowchart for STA behaviour under type 2 code block segmentation.
FIG. 10B shows a flowchart for processing code blocks under type 2 code block segmentation.

FIG. 10A shows a flowchart 1000 for STA behaviour under type 2 code block segmentation (i.e. behaviour of an intended STA that receives the encoded code blocks shown in FIG. 7 and FIG. 8). The process begins from step 1002. At step 1004, the data field is demodulated. At step 1006, each code block is decoded. At step 1008, each code block is descrambled. At step 1010, the code blocks are processed. At step 1012, HARQ feedback based on CRC check result is generated. The process then ends at step 1014. Advantageously for type 2 code block segmentation, since HARQ feedback is based on CRC check result at the PHY layer, there is no need to pass the resultant bits obtained from descrambled code blocks to MAC layer as required in type 1 code block segmentation.

Step 1010 of processing the code blocks is shown in more detail in flowchart 1016 of FIG. 10B. The process of flowchart 1016 to process the code blocks starts from step 1018. At step 1020, a CB counter is set to 1. At step 1022, it is determined whether a (CB counter)-th code block is attached with CRC. If it is determined that (CB counter)-th code block is attached with CRC, the process proceeds to step 1024 wherein the CRC in the concerned code block is checked. At step 1026, the CB counter is incremented by 1. At step 1028, it is determined whether the CB counter is greater than $N_{CB}$ i.e. the total number of code blocks in the concerned data field. If it is determined that the value of the CB counter is not greater than $N_{CB}$, the process goes back to step 1022. On the other hand, if it is determined at step 1022 that the (CB counter)-th code block is attached with CRC, the process skips step 1024 and proceeds from step 1022 to step 1026 where the CB-counter is incremented by 1. The loop process between step 1022 and step 1028 continues until the CB counter value is greater than $N_{CB}$. Then the process proceeds and ends at step 1030.

Advantageously, type 2 code block segmentation is efficient for transmission of an A-MPDU containing one or more large-size MPDU because only part of the code blocks with NACK corresponding to each large-size MPDU needs to be retransmitted. However, a code block based HARQ feedback mechanism may be required.

Figure 11:
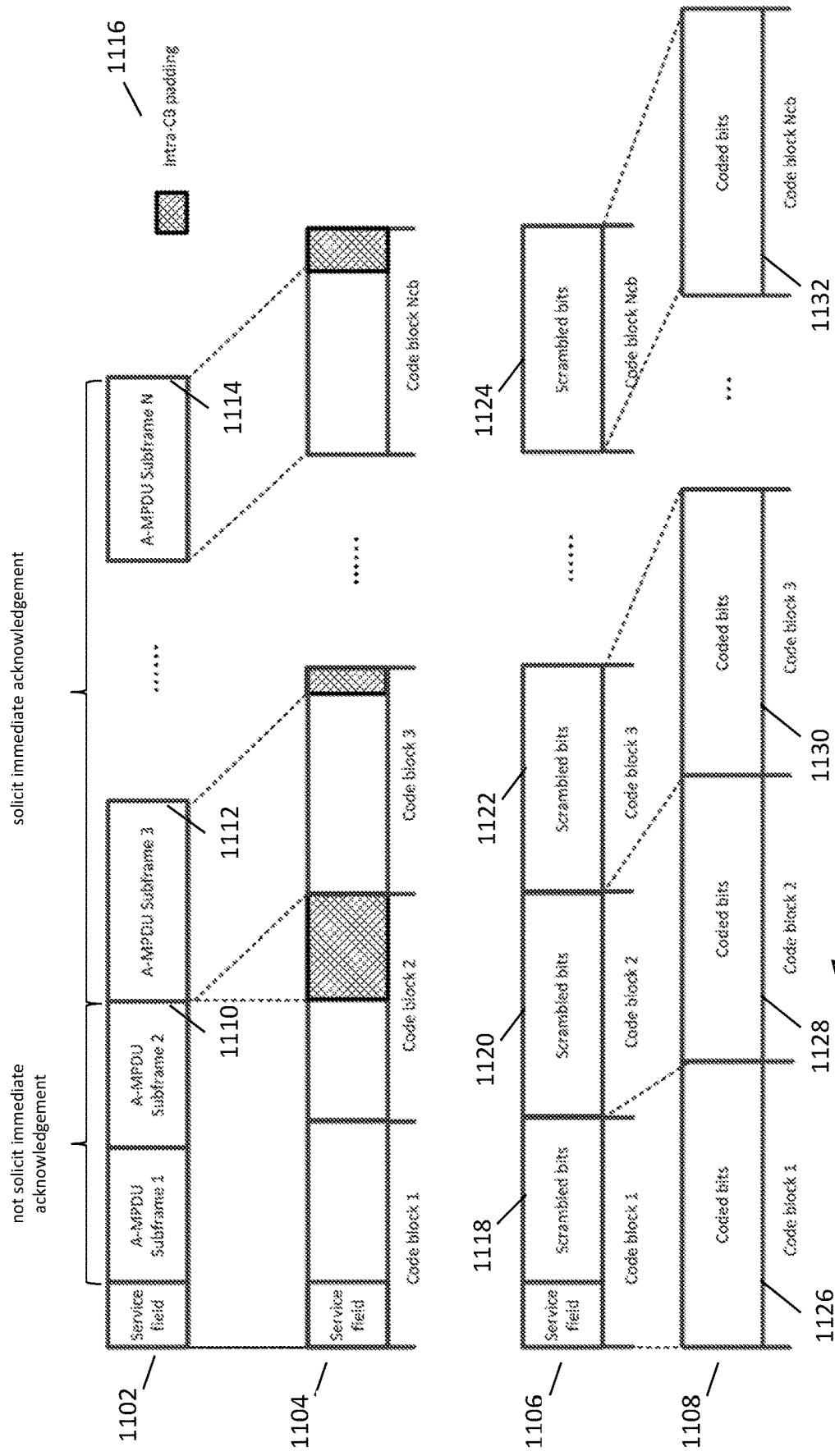
FIG. 11 shows an illustration of a LDPC encoding process of a data field containing an initial transmission, the data field having a type 3 code block segmentation.

FIG. 11 shows an illustration 1100 of a LDPC encoding process of a data field 1102 containing an initial transmission, the data field having a type 3 code block segmentation. The data field 1102 may be in the format of the data field in the PPDU 200, and may include a service field followed by an A-MPDU comprising one or more A-MPDU subframes, i.e. A-MPDU subframe 1, A-MPDU subframe 2 up to A-MPDU subframe N, such that the A-MPDU is prepended by the service field. An A-MPDU subframe includes at most one MPDU. The A-MPDU subframes 1 and 2 do not solicit immediate acknowledgement and is placed in the data field 1102 before the A-MPDU subframes 3 up to N that solicit immediate acknowledgement. Advantageously, code blocks requiring HARQ feedback can be indicated by a starting code block number and the number of code blocks requiring HARQ feedback; thus HARQ signaling overhead and HARQ feedback overhead may be reduced.

During CB segmentation 1104, the A-MPDU subframes 1, 2 up to N are segmented into one or more code blocks. For example, A-MPDU subframe 1 is mapped to code block 1, A-MPDU subframe 2 is mapped to code block 2, A-MPDU subframe 3 is mapped to code block 3, and A-MPDU subframe N is mapped to code block $N_{CB}$. Each code block 1, 2, 3 up to N has a same code block size, and may contain whole or part of a single A-MPDU subframe. The first code block, i.e. code block 1, may further contain the service field. In type 3 code block segmentation, A-MPDU subframes not soliciting immediate acknowledgement correspond to one or more code block not requiring HARQ feedback, the last of the one or more code block not requiring HARQ feedback is aligned with the boundary of the last A-MPDU subframe not soliciting immediate acknowledgement. If an A-MPDU subframe soliciting immediate acknowledgement correspond to a single code block requiring HARQ feedback, the code block requiring HARQ feedback is aligned with the boundary of the A-MPDU subframe soliciting immediate acknowledgement. If an A-MPDU subframe soliciting immediate acknowledgement correspond to more than one code blocks requiring HARQ feedback, the last of the more than one code blocks requiring HARQ feedback is aligned with the boundary of the A-MPDU subframe soliciting immediate acknowledgement. If more than one A-MPDU subframes soliciting immediate acknowledgement correspond to a single code block requiring HARQ feedback, the code block requiring HARQ feedback is aligned with the boundary of the last of the more than one A-MPDU subframes soliciting immediate acknowledgement. Furthermore, the MAC layer needs to inform PHY layer of the total size of A-MPDU subframes not soliciting immediate acknowledgement in an A-MPDU, as well as inform PHY layer of the size of each of A-MPDU subframes soliciting immediate acknowledgement in an A-MPDU. Therefore, code blocks 2, 3 and $N_{CB}$ align with A-MPDU subframe boundaries 1110, 1112 and 1114 respectively. Intra-CB padding bits 1116 may be appended to each of the code blocks 2, 3 and $N_{CB}$ which are aligned with A-MPDU subframe boundaries 1110, 1112 and 1114 to fill up the code blocks 2, 3 and $N_{CB}$ to the code block size. It should be noted that the intra-padding bits 1116 which are applied to the last code block $N_{CB}$ absorb pre-FEC padding bits so that the last code block is also aligned with symbol segment boundary in the last OFDM symbol (in case of no STBC applied to the data field) or in the last two OFDM symbols (in case of STBC applied to the data field).

After CB segmentation 1104, the code blocks undergo scrambling per code block process 1106 such that A-MPDU subframe bits and intra-padding bits (if any) contained in each code block are scrambled. For example, after the scrambling process 1106, code block 1 comprises the service field and scrambled bits 1118, code block 2 comprises scrambled bits 1120, code block 3 comprises scrambled bits 1122 and code block $N_{CB}$ comprises scrambled bits 1124. The initial state of each scrambling is the same with the first scrambling, which is the first N bits of the service field where N is a determined positive integer (e.g. 7 or 11). Further, these scrambled code blocks undergo LDPC coding process 1108 so that the contents of each code block are encoded using LDPC. For code block 1, the scrambled bits and service field are encoded using LDPC. For example, after LDPC coding process 1108, code block 1 comprises coded bits 1126, code block 2 comprises coded bits 1128, code block 3 comprises coded bits 1130 and code block $N_{CB}$ comprises coded bits 1132. Thereafter, remaining transmitter processing for the encoded code blocks is the same as 11ax HE SU PPDU.

Figure 12:
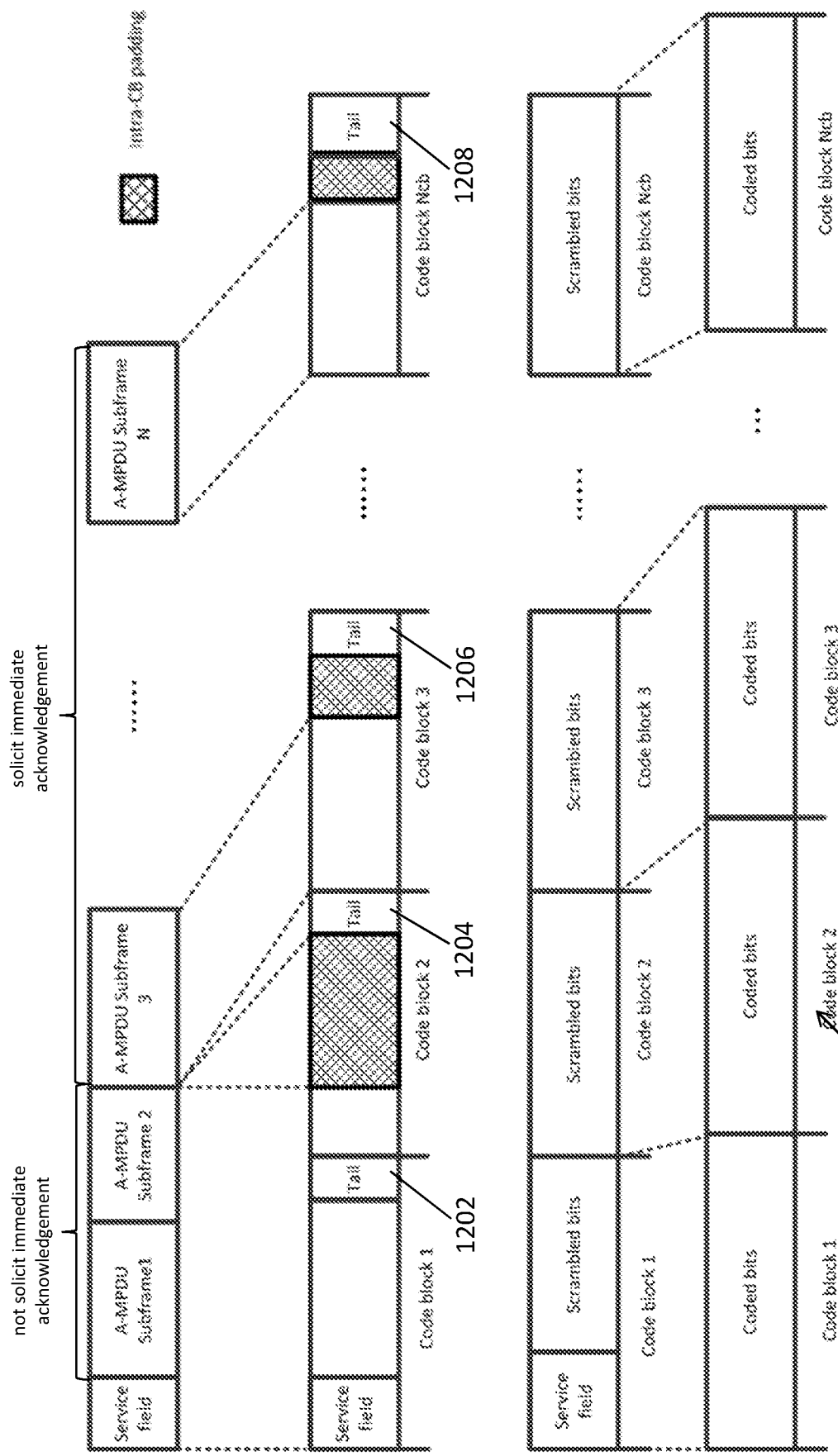
FIG. 12 shows an illustration of a BCC encoding process of a data field containing an initial transmission, the data field having a type 3 code block segmentation.

FIG. 12 shows an illustration 1200 of a BCC encoding process of a data field containing an initial transmission, the data field having a type 3 code block segmentation. While the process for BCC encoding is similar to that shown in illustration 1100, tail bits are appended at the end of each code block. For example, tail bits 1202, 1204, 1206 and 1208 are appended at the end of code block 1, code block 2, code block 3 and code block $N_{CB}$ respectively. Thereafter, the code blocks undergo scrambling per code block such that A-MPDU subframe bits, intra-padding bits (if any) and tail bits contained in each code block are scrambled. These scrambled code blocks then undergo BCC coding so that the contents of each code block are encoded using BCC.

Figure 13:
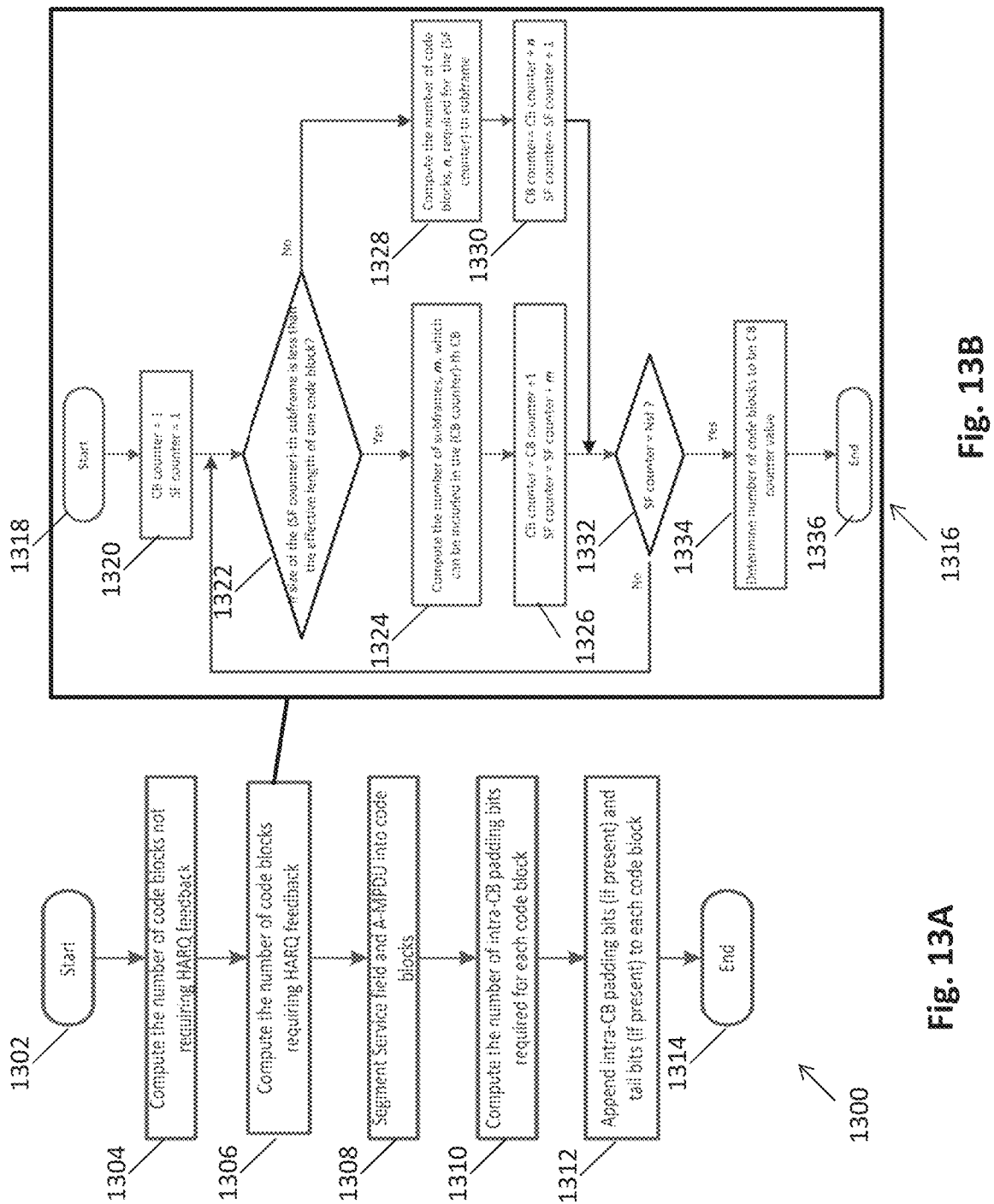
FIG. 13A shows a flowchart for type 3 code block segmentation.
FIG. 13B shows a flowchart for computing number of code blocks requiring HARQ feedback for type 3 code block segmentation.

FIG. 13A shows a flowchart 1300 for type 3 code block segmentation as depicted in FIGS. 11 and 12. The process starts at step 1302. At step 1304, the number of code blocks not requiring HARQ feedback is computed using formula $$N_{CB,nfb} = \left\lceil \frac{L_{MPDU,nfb} + N_{SERVICE}}{1944 \cdot R \cdot N_{CW,CB}} \right\rceil$$

wherein $N_{CB,nfb}$ is the number of code blocks not requiring HARQ feedback, $L_{MPDU,nfb}$ is the length of A-MPDU subframes not soliciting immediate acknowledgement and R is the code rate. At step 1306, the number of code blocks requiring HARQ feedback is computed. At step 1308, the service field and A-MPDU are segmented into code blocks. At step 1310, the number of intra-CB padding bits required for each code block is computed. At step 1312, intra-CB padding bits (if present) and tail bits (if present, in the case of BCC encoding process as illustrated in FIG. 12) are appended to each code block. The process then ends at step 1314.

The process of how the number of code blocks requiring HARQ feedback is computed at step 1306 is shown in more detail in flowchart 1316 of FIG. 13B. The process of flowchart 1316 to compute the number of code blocks requiring HARQ feedback starts from step 1318. At step 1320, a CB counter and SF counter are both set to 1. At step 1322, it is determined whether the size of the (SF counter)-th subframe is less than the effective length of one code block. For a code block requiring HARQ feedback, the effective length is the size of the code block excluding service field (in case of the first code block) and tail bits (in case of BCC coding). If it is determined that size of the (SF counter)-th subframe is not less than the effective length of one code block, the process proceeds to step 1328 wherein the number of code blocks, n, required for the (SF counter)-th subframe is computed. At step 1330, the CB counter is incremented by n and the SF counter is incremented by 1. At step 1332, it is determined whether the SF counter has reached a value that is equal to $N_{SF}$. Unlike type 1 and type 2 code block segmentation, $N_{SF}$ for type 3 code block segmentation is the total number of A-MPDU subframes that solicit immediate acknowledgement in an A-MPDU. If it is determined that the value of the SF counter is not equal to $N_{SF}$, the process goes back to step 1322. On the other hand, if it is determined at step 1322 that the size of the (SF counter)-th subframe is less than the effective length of one code block, the process proceeds from step 1322 to step 1324 where the number of subframes, m, which can be included in the (CB counter)-th code block is computed. If no more than one A-MPDU subframe that solicit immediate acknowledgement can be mapped to a same code block, then m=1. At step 1326, the CB counter is incremented by 1 and the SF counter is incremented by m. The process then proceeds to step 1332, where the loop process between step 1322 and step 1332 continues until the SF counter value is equal to $N_{SF}$. Then the process proceeds to step 1334 where the number of code blocks needed (i.e. the final value of the CB counter) is determined. The process then ends at step 1336.

STA behavior for type 3 code block segmentation is the same as type 1 code block segmentation i.e. as shown in flowchart 600 of FIG. 6. Advantageously, type 3 code block segmentation is similar to type 1 code block segmentation except less code blocks may be required for an A-MPDU. However, similar to type 1, type 3 code block segmentation may be inefficient for transmission of an A-MPDU containing one or more large-size MPDU since all code blocks corresponding to each large-size MPDU with NACK need to be retransmitted.

Figure 14:
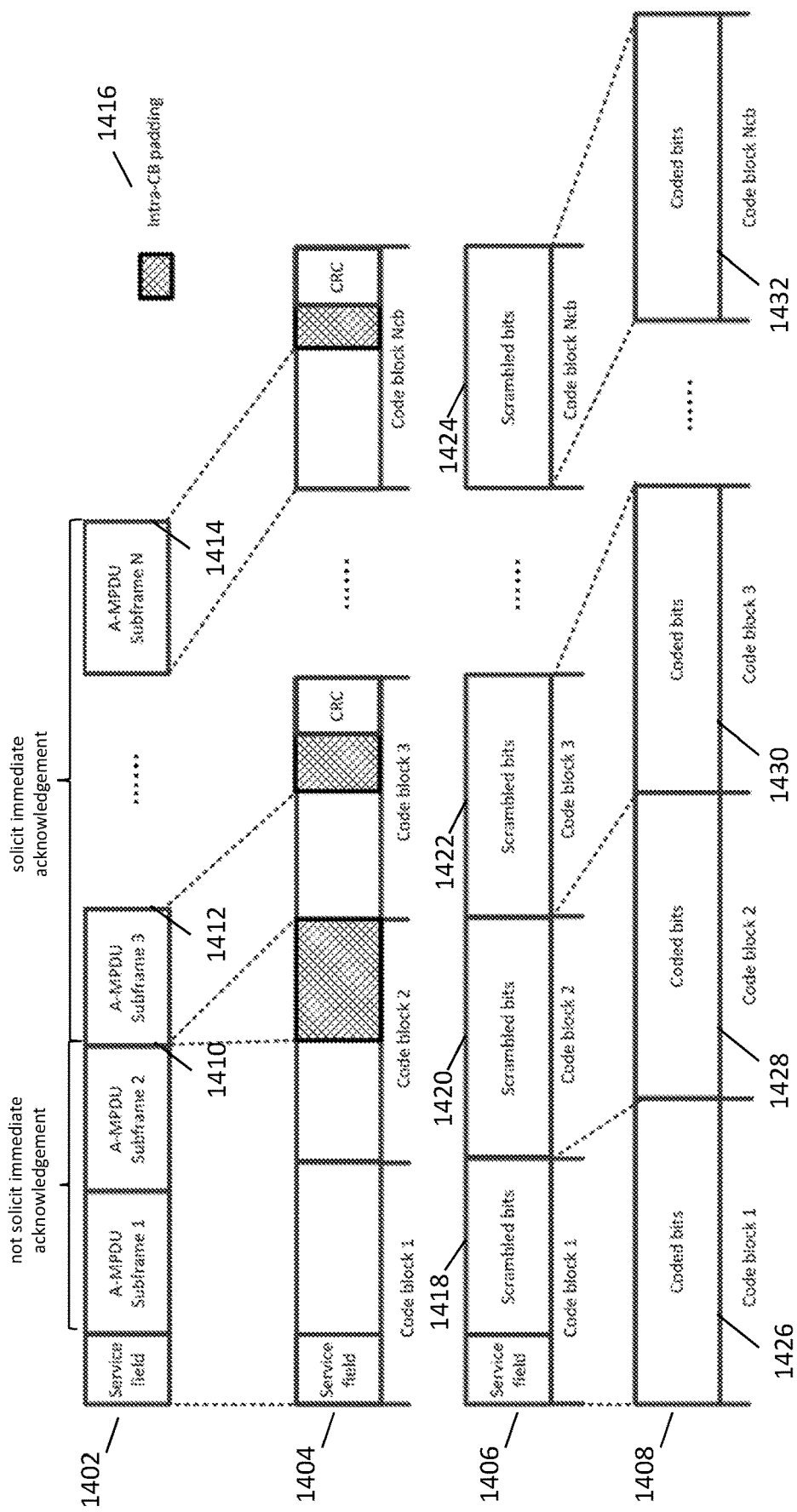
FIG. 14 shows an illustration of a LDPC encoding process of a data field containing an initial transmission, the data field having a type 4 code block segmentation.

FIG. 14 shows an illustration 1400 of a LDPC encoding process of a data field 1402 containing an initial transmission, the data field having a type 4 code block segmentation. The data field 1402 may be in the format of the data field in the PPDU 200, and may include a service field followed by an A-MPDU comprising one or more A-MPDU subframes, i.e. A-MPDU subframe 1, A-MPDU subframe 2 up to A-MPDU subframe N, such that the A-MPDU is prepended by the service field. The A-MPDU subframes 1 and 2 do not solicit immediate acknowledgement and are placed in the data field 1402 before the A-MPDU subframes 3 up to N that solicit immediate acknowledgement. Advantageously, code blocks requiring HARQ feedback can be indicated by a starting code block number and the number of code blocks requiring HARQ feedback; thus HARQ signaling overhead and HARQ feedback overhead may be reduced.

During CB segmentation 1404, the A-MPDU subframes 1, 2 up to N are segmented into one or more code blocks. For example, A-MPDU subframe 1 is mapped to code block 1, A-MPDU subframe 2 is mapped to code block 2, A-MPDU subframe 3 is mapped to code block 3, and A-MPDU subframe N is mapped to code block $N_{CB}$. Each code block 1, 2, 3 up to N has a same code block size, and may contain whole or part of a single A-MPDU subframe. The first code block, i.e. code block 1, may further contain the service field. In type 4 code block segmentation, A-MPDU subframes not soliciting immediate acknowledgement correspond to one or more code block not requiring HARQ feedback, the last of the one or more code block not requiring HARQ feedback is aligned with the boundary of the last A-MPDU subframe not soliciting immediate acknowledgement. If an A-MPDU subframe soliciting immediate acknowledgement correspond to a single code block requiring HARQ feedback, the code block requiring HARQ feedback is aligned with the boundary of the A-MPDU subframe soliciting immediate acknowledgement. If an A-MPDU subframe soliciting immediate acknowledgement correspond to more than one code blocks requiring HARQ feedback, the last of the more than one code blocks requiring HARQ feedback is aligned with the boundary of the A-MPDU subframe soliciting immediate acknowledgement. If more than one A-MPDU subframes soliciting immediate acknowledgement correspond to a single code block requiring HARQ feedback, the code block requiring HARQ feedback is aligned with the boundary of the last of the more than one A-MPDU subframes soliciting immediate acknowledgement. Each of code blocks requiring HARQ feedback is attached with a CRC. Furthermore, the MAC layer needs to inform PHY layer of the total size of A-MPDU subframes not soliciting immediate acknowledgement in an A-MPDU, as well as inform PHY layer of the size of each of A-MPDU subframes soliciting immediate acknowledgement in an A-MPDU. Therefore, the code blocks 2, 3 and $N_{CB}$ align with A-MPDU subframe boundaries 1410, 1412 and 1414 respectively. Intra-CB padding bits 1416 may be appended to each of the code blocks 2, 3 and $N_{CB}$ which are aligned with A-MPDU subframe boundaries 1410, 1412 and 1414 to fill up the code blocks 2, 3 and $N_{CB}$ to the code block size. It should be noted that the intra-padding bits 1416 which are applied to the last code block $N_{CB}$ absorb pre-FEC padding bits so that the last code block is also aligned with symbol segment boundary in the last OFDM symbol (in case of no STBC applied to the data field) or in the last two OFDM symbols (in case of STBC applied to the data field). Furthermore, code blocks 3 and $N_{CB}$ are attached with CRC since they require HARQ feedback.

After CB segmentation 1404, the code blocks undergo scrambling per code block process 1406 such that A-MPDU subframe bits and intra-padding bits (if any) contained in each code block are scrambled. For example, after the scrambling process 1406, code block 1 comprises the service field and scrambled bits 1418, code block 2 comprises scrambled bits 1420, code block 3 comprises scrambled bits 1422 and code block $N_{CB}$ comprises scrambled bits 1424. The initial state of each scrambling is the same with the first scrambling, which is the first N bits of the service field where N is a determined positive integer (e.g. 7 or 11). Further, these scrambled code blocks undergo LDPC coding process 1408 so that the contents of each code block are encoded using LDPC. For code block 1, the scrambled bits and service field are encoded using LDPC. For example, after LDPC coding process 1408, code block 1 comprises coded bits 1426, code block 2 comprises coded bits 1428, code block 3 comprises coded bits 1430 and code block $N_{CB}$ comprises coded bits 1432. Thereafter, remaining transmitter processing for the encoded code blocks is the same as 11ax HE SU PPDU.

Figure 15:
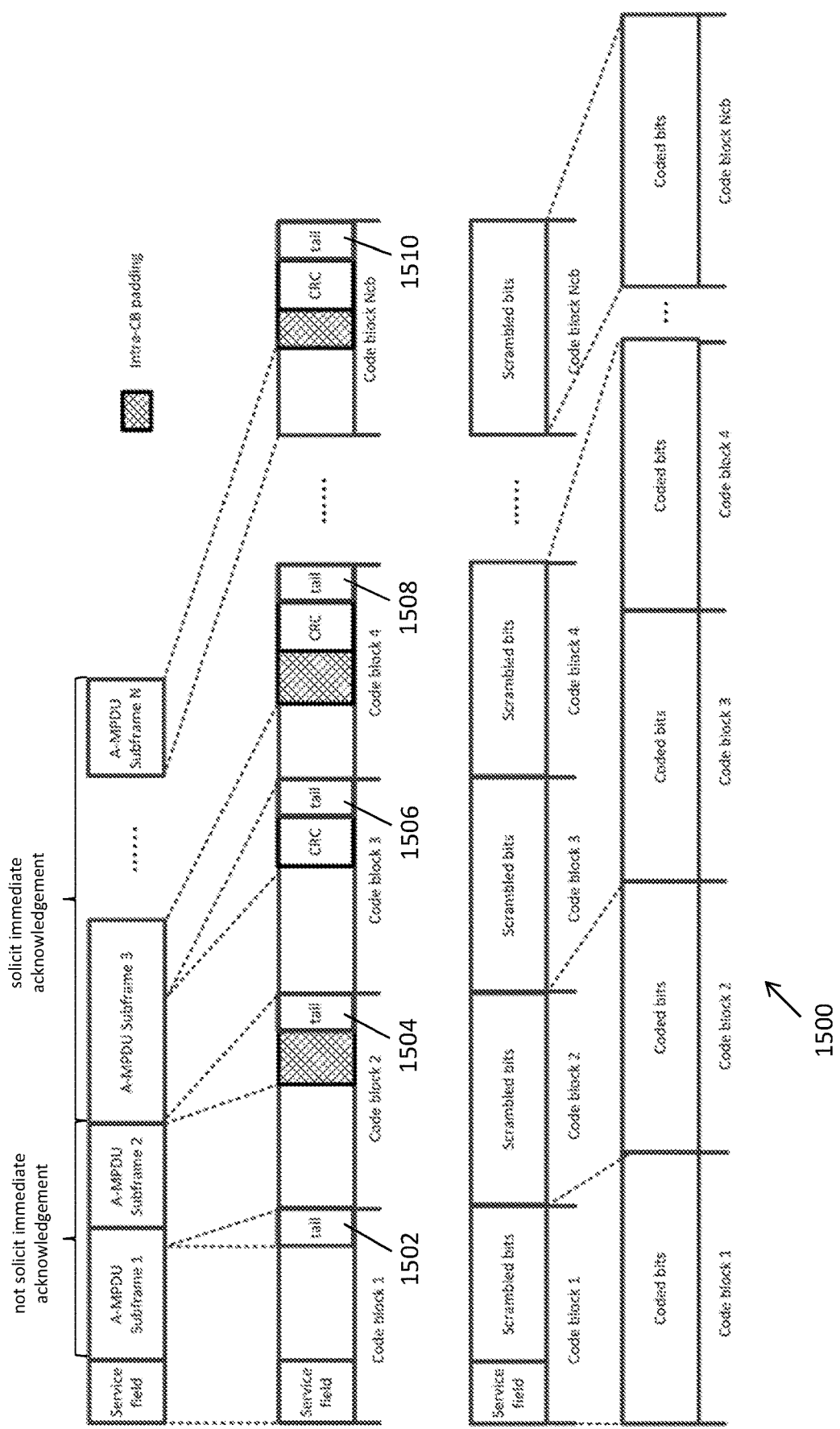
FIG. 15 shows an illustration of a BCC encoding process of a data field containing an initial transmission, the data field having a type 4 code block segmentation.

FIG. 15 shows an illustration 1500 of a BCC encoding process of a data field containing an initial transmission, the data field having a type 4 code block segmentation. While the process for BCC encoding is similar to that shown in illustration 1500, tail bits are appended at the end of each code block. For example, tail bits 1502, 1504, 1506, 1508 and 1510 are appended at the end of code block 1, code block 2, code block 3, code block 4 and code block $N_{CB}$ respectively. Thereafter, the code blocks undergo scrambling per code block such that A-MPDU subframe bits, intra-padding bits (if any) and tail bits contained in each code block are scrambled. These scrambled code blocks then undergo BCC coding process so that the contents of each code block are encoded using BCC.

Figures 16A, 16B:
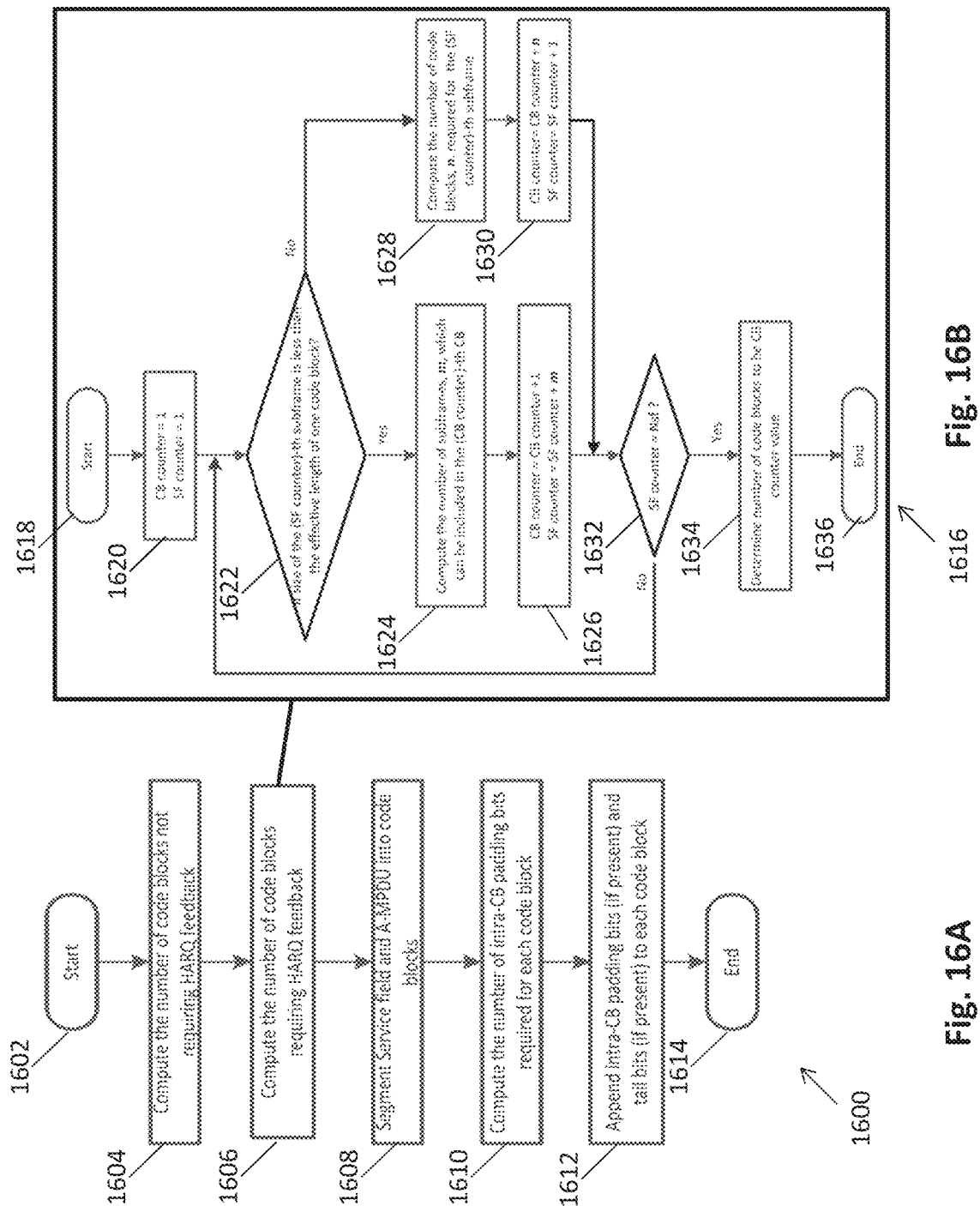
FIG. 16A shows a flowchart for type 4 code block segmentation.
FIG. 16B shows a flowchart for computing number of code blocks requiring HARQ feedback for type 4 code block segmentation.

FIG. 16A shows a flowchart 1600 for type 4 code block segmentation as depicted in FIGS. 14 and 15. The process starts at step 1602. At step 1604, the number of code blocks not requiring HARQ feedback is computed using formula $$N_{CB,nfb} = \left\lceil \frac{L_{MPDU,nfb} + N_{SERVICE}}{1944 \cdot R \cdot N_{CW,CB}} \right\rceil$$

wherein $N_{CB,nfb}$ is the number of code blocks not requiring HARQ feedback, $L_{MPDU,nfb}$ is the length of A-MPDU subframes not soliciting immediate acknowledgement and R is the code rate. At step 1606, the number of code blocks requiring HARQ feedback is computed. At step 1608, the service field and A-MPDU are segmented into code blocks. At step 1610, the number of intra-CB padding bits required for each code block is computed. At step 1612, intra-CB padding bits (if present) and tail bits (if present, in the case of BCC encoding process as illustrated in FIG. 15) are appended to each code block. The process then ends at step 1614.

The process of how the number of code blocks requiring HARQ feedback is computed at step 1606 is shown in more detail in flowchart 1616 of FIG. 16B. The process of flowchart 1616 to compute the number of code blocks requiring HARQ feedback starts from step 1618. At step 1620, a CB counter and SF counter are both set to 1. At step 1622, it is determined whether the size of the (SF counter)-th subframe is less than the effective length of one code block. For a code block requiring HARQ feedback, the effective length is the size of the code block excluding CRC, service field (in case of the first code block) and tail bits (in case of BCC coding). If it is determined that size of the (SF counter)-th subframe is not less than the effective length of one code block, the process proceeds to step 1628 wherein the number of code blocks, n, required for the (SF counter)-th subframe is computed. At step 1630, the CB counter is incremented by n and the SF counter is incremented by 1. At step 1632, it is determined whether the SF counter has reached a value that is equal to $N_{SF}$. Similar to type 3 code block segmentation, $N_{SF}$ for type 4 code block segmentation is the total number of A-MPDU subframes that solicit immediate acknowledgement in an A-MPDU. If it is determined that the value of the SF counter is not equal to $N_{SF}$, the process goes back to step 1622. On the other hand, if it is determined at step 1622 that the size of the (SF counter)-th subframe is less than the effective length of one code block, the process proceeds from step 1622 to step 1624 where the number of subframes, m, which can be included in the (CB counter)-th code block is computed. If no more than one A-MPDU subframe that solicit immediate acknowledgement can be mapped to a same code block, then m=1. At step 1626, the CB counter is incremented by 1 and the SF counter is incremented by m. The process then proceeds to step 1632, where the loop process between step 1622 and step 1632 continues until the SF counter value is equal to $N_{SF}$. Then the process proceeds to step 1634 where the number of code blocks needed (i.e. the final value of the CB counter) is determined. The process then ends at step 1636.

STA behavior for type 4 code block segmentation is the same as type 2 code block segmentation i.e. as shown in flowchart 1000 of FIG. 10A. Type 4 code block segmentation also has similar advantages as type 2 code block segmentation except less code blocks may be required for an A-MPDU than type 2 code block segmentation. However, similar to type 2 code block segmentation, code block based HARQ feedback mechanism needs to be developed since existing MPDU based acknowledgement mechanism for HARQ feedback cannot be reused for type 4 code block segmentation.

Figure 17:
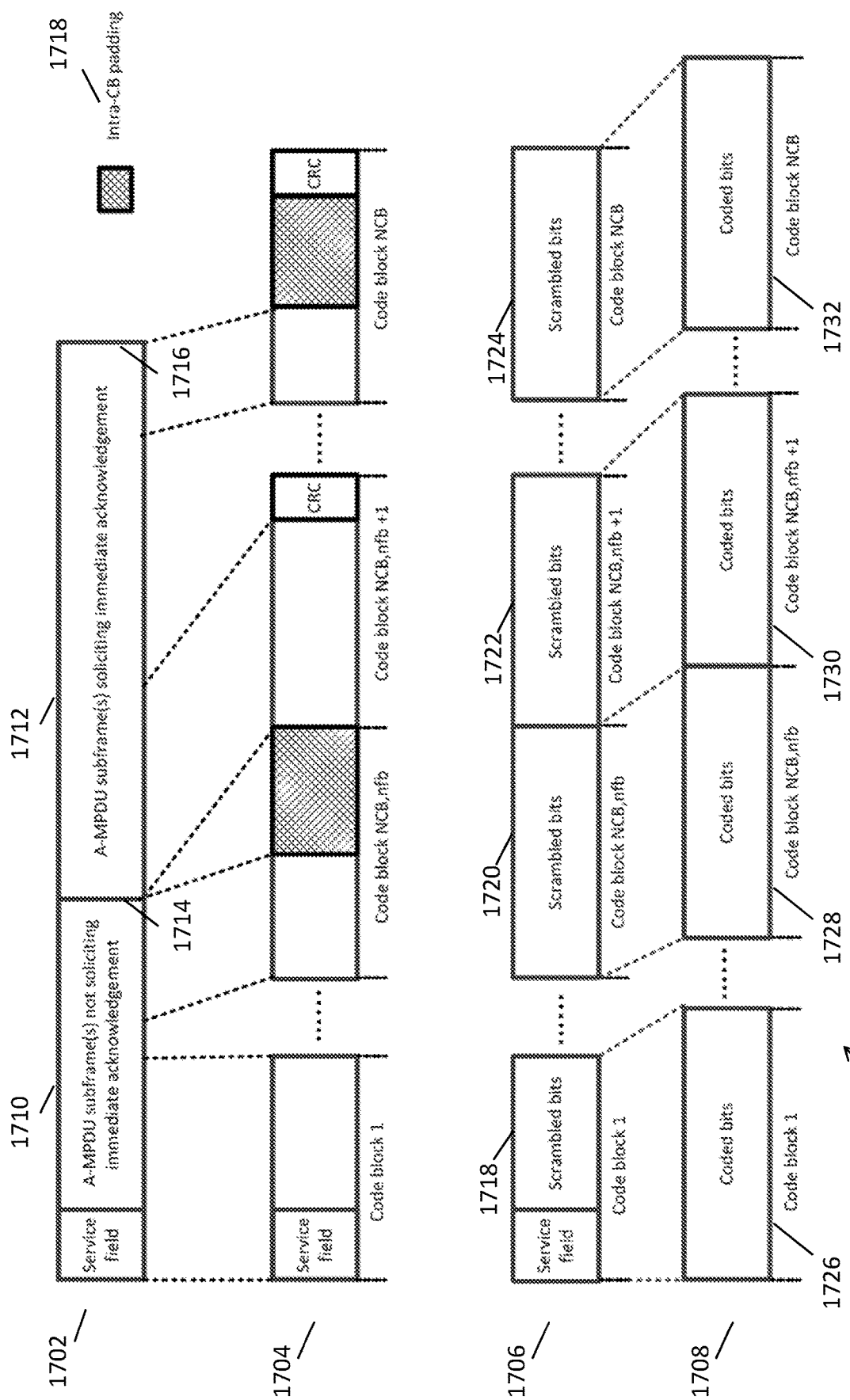
FIG. 17 shows an illustration of a LDPC encoding process of a data field containing an initial transmission, the data field having a type 5 code block segmentation.

FIG. 17 shows an illustration 1700 of a LDPC encoding process of a data field 1702 containing an initial transmission, the data field having a type 5 code block segmentation. The data field 1702 may be in the format of the data field in the PPDU 200, and may include a service field followed by an A-MPDU comprising A-MPDU subframes, i.e. one or more A-MPDU subframe(s) 1710 not soliciting immediate acknowledgement and one or more A-MPDU subframe(s) 1712 soliciting immediate acknowledgement. The one or more A-MPDU subframe(s) 1710 not soliciting immediate acknowledgement are placed in the data field 1702 before the one or more A-MPDU subframe(s) 1712 soliciting immediate acknowledgement. Advantageously, code blocks requiring HARQ feedback can be indicated by a starting code block number and the number of code blocks requiring HARQ feedback; thus HARQ signaling overhead and HARQ feedback overhead may be reduced.

During CB segmentation 1704, the A-MPDU subframes are segmented into code blocks. For example, A-MPDU subframe(s) 1710 are segmented and mapped to code block 1 up to code block $N_{CB,nfb}$, while A-MPDU subframe(s) 1712 are segmented and mapped to code block $N_{CB,nfb}+1$ up to code block $N_{CB}$. Each code block has a same code block size, and may contain whole or part of a single A-MPDU subframe. The first code block, i.e. code block 1, may further contain the service field. In type 5 code block segmentation, A-MPDU subframes not soliciting immediate acknowledgement correspond to one or more code block not requiring HARQ feedback, the last of the one or more code block not requiring HARQ feedback is aligned with the boundary of the last A-MPDU subframe not soliciting immediate acknowledgement. If A-MPDU subframes soliciting immediate acknowledgement correspond to one or more code block requiring HARQ feedback, the last of the one or more code block requiring HARQ feedback is aligned with the boundary of the last A-MPDU subframe soliciting immediate acknowledgement. Each of code blocks requiring HARQ feedback is attached with a CRC. Furthermore, the MAC layer needs to inform PHY layer of the total size of A-MPDU subframes not soliciting immediate acknowledgement in an A-MPDU, as well as inform PHY layer of the total size of A-MPDU subframes soliciting immediate acknowledgement in an A-MPDU. Therefore, since A-MPDU subframe(s) 1710 not soliciting immediate acknowledgement are segmented and mapped to code block 1 up to code block $N_{CB,nfb}$, then $N_{CB,nfb}$ is the number of code blocks not requiring HARQ feedback. The code block $N_{CB,nfb}$ and code block $N_{CB}$ align with A-MPDU subframe boundaries 1714 and 1716 respectively. Intra-CB padding bits 1718 may be appended to each of the code blocks $N_{CB,nfb}$ and $N_{CB}$ which are aligned with A-MPDU subframe boundaries 1714 and 1716 to fill up the code blocks $N_{CB,nfb}$ and $N_{CB}$ to the code block size. It should be noted that the intra-padding bits 1718 which are applied to the last code block $N_{CB}$ absorb pre-FEC padding bits so that the last code block is also aligned with symbol segment boundary in the last OFDM symbol (in case of no STBC applied to the data field) or in the last two OFDM symbols (in case of STBC applied to the data field). Furthermore, code block $N_{CB,nfb}$+1 up to code block $N_{CB}$ are attached with CRC since they require HARQ feedback.

After CB segmentation 1704, the code blocks undergo scrambling per code block process 1706 such that A-MPDU subframe bits and intra-padding bits (if any) contained in each code block are scrambled. For example, after the scrambling process 1706, code block 1 comprises the service field and scrambled bits 1718, code block $N_{CB,nfb}$ comprises scrambled bits 1720, code block $N_{CB,nfb}$+1 comprises scrambled bits 1722 and code block $N_{CB}$ comprises scrambled bits 1724. The initial state of each scrambling is the same with the first scrambling, which is the first N bits of the service field where N is a determined positive integer (e.g. 7 or 11). Further, these scrambled code blocks undergo LDPC coding process 1708 so that the contents of each code block are encoded using LDPC. For code block 1, the scrambled bits and service field are encoded using LDPC. For example, after LDPC coding process 1708, code block 1 comprises coded bits 1726, code block $N_{CB,nfb}$ comprises coded bits 1728, code block $N_{CB,nfb}$+1 comprises coded bits 1730 and code block $N_{CB}$ comprises coded bits 1732. Thereafter, remaining transmitter processing for the encoded code blocks is the same as 11ax HE SU PPDU.

Figure 18:
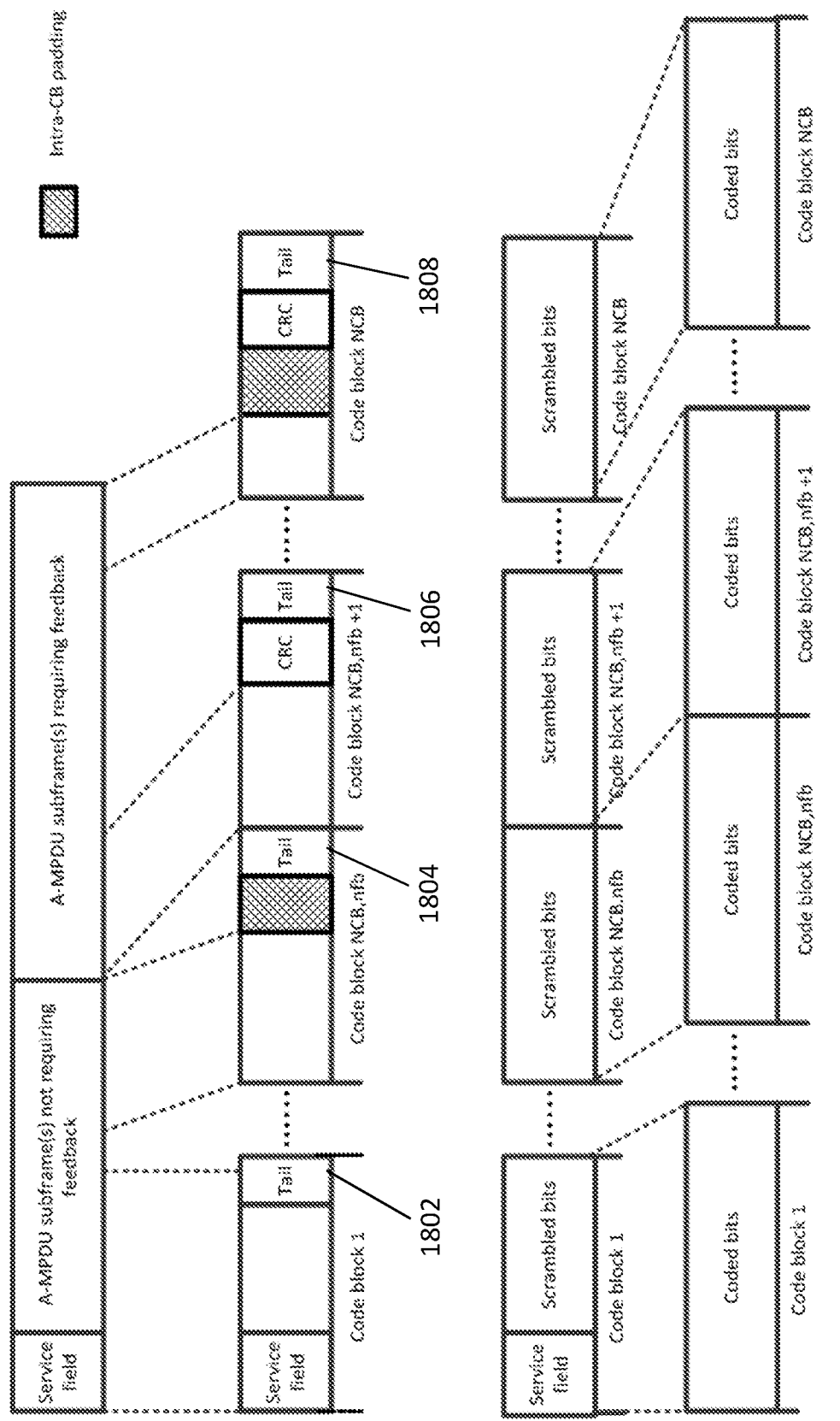
FIG. 18 shows an illustration of a BCC encoding process of a data field containing an initial transmission, the data field having a type 5 code block segmentation.

FIG. 18 shows an illustration 1800 of a BCC encoding process of a data field containing an initial transmission, the data field having a type 5 code block segmentation. While the process for BCC encoding is similar to that shown in illustration 1800, tail bits are appended at the end of each code block. For example, tail bits 1802, 1804, 1806 and 1808 are appended at the end of code block 1, code block $N_{CB,nfb}$, code block $N_{CB,nfb}$ and code block $N_{CB}$ respectively. Thereafter, the code blocks undergo scrambling per code block such that A-MPDU subframe bits, intra-padding bits (if any) and tail bits contained in each code block are scrambled. These scrambled code blocks then undergo BCC coding process so that the contents of each code block are encoded using BCC.

Figure 19:
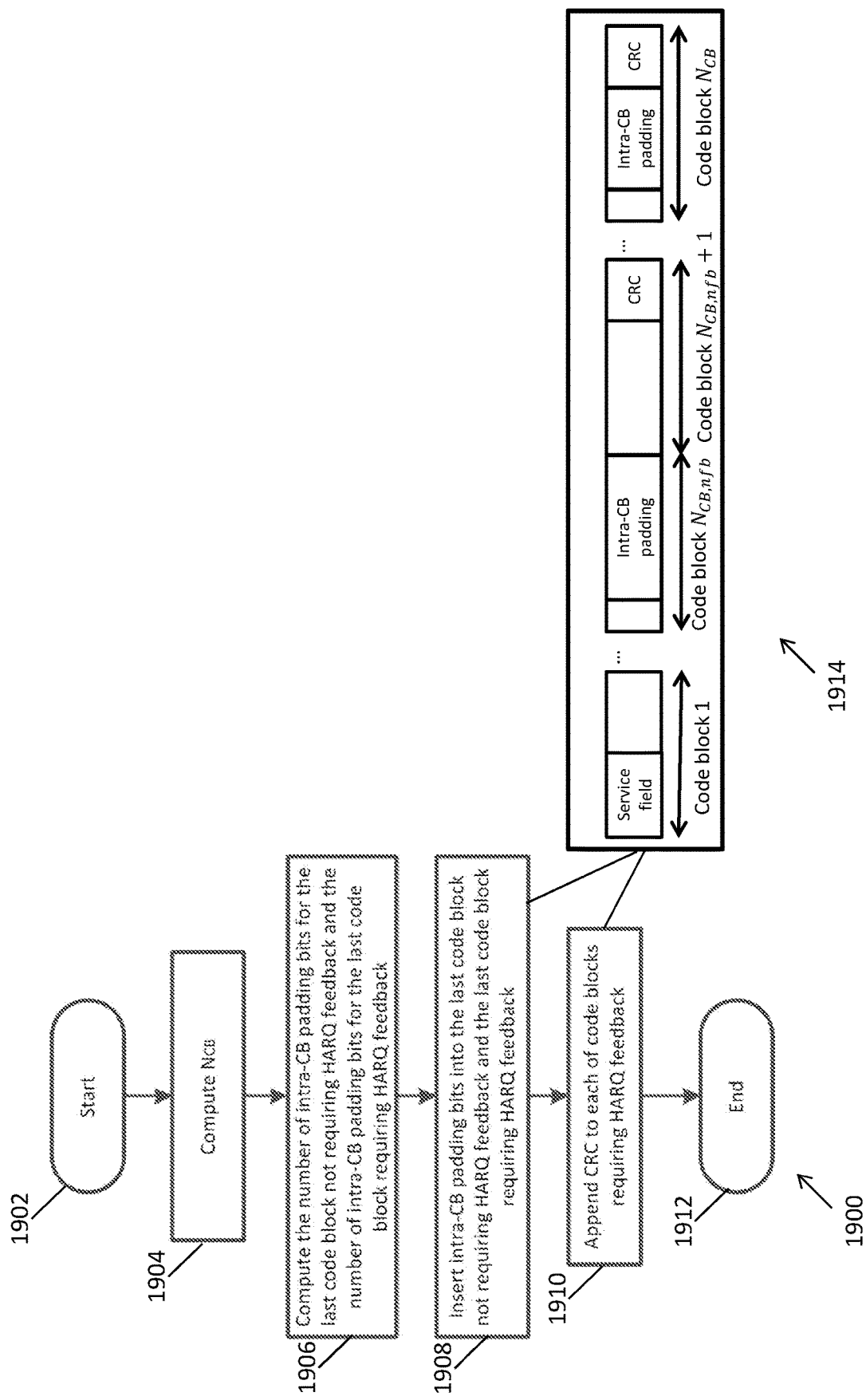
FIG. 19 shows a flowchart for type 5 code block segmentation having LDPC.

FIG. 19 shows a flowchart 1900 for type 5 code block segmentation as depicted in FIG. 17. The process starts at step 1902. At step 1904, the value of $N_{CB}$ is computed by formula $N_{CB}=N_{CB,nfb}+N_{CB,fb}$, wherein $$N_{CB,nfb} = \left\lceil \frac{L_{MPDU,nfb} + N_{SERVICE}}{1944 \cdot R \cdot N_{CW,CB}} \right\rceil, N_{CB,fb} = \left\lceil \frac{L_{MPDU,fb} + +N_{SERVICE}}{1944 \cdot R \cdot N_{CW,CB} - L_{CRC}} \right\rceil,$$

and wherein $N_{CB,nfb}$ is the number of code blocks not requiring HARQ feedback, $N_{CB,fb}$ is the number of code blocks requiring HARQ feedback, $L_{MPDU,nfb}$ is the length of A-MPDU subframes not soliciting immediate acknowledgement, $L_{MPDU,fb}$ is the length of A-MPDU subframes soliciting immediate acknowledgement, $N_{SERVICE}$ is the number of bits in the service field, which is equal to 0 if code blocks requiring HARQ feedback do not include the service field, R is the code rate and $L_{CRC}$ is the length of CRC per code block. At step 1906, the number of intra-CB padding bits for the last code block not requiring HARQ feedback is computed using formula $N_{IntraCB,nfb}=N_{CB,nfb}\cdot N_{CW,CB}\cdot 1944\cdot R-L_{MPDU,nfb}-N_{SERVICE}$ and the number of intra-CB padding bits for the last code block requiring HARQ feedback is computed using formula $N_{IntraCB,fb}=N_{CB,fb}\cdot N_{CW,CB}\cdot 1944\cdot R-L_{MPDU,fb}-N_{SERVICE}-L_{CRC}\cdot N_{CB,fb}$, wherein $N_{CW,CB}$ is the number of codewords per code block, $N_{IntraCB,nfb}$ is the number of intra-CB padding bits in the last code block not requiring HARQ feedback and $N_{IntraCB,fb}$ is the number of intra-CB padding bits in the last code block requiring HARQ feedback. At step 1908, intra-CB padding bits are inserted into the last code block not requiring HARQ feedback and the last code block requiring HARQ feedback. At step 1910, CRC is appended to each of code blocks requiring HARQ feedback. Steps 1908 and 1910 are depicted in detail by illustration 1914 wherein intra-CB padding bits are inserted into code block $N_{CB,nfb}$ (i.e. the last code block not requiring HARQ feedback as seen in FIG. 17) and code block $N_{CB}$ (i.e. the last code block requiring HARQ feedback as seen in FIG. 17), and CRC are appended to code block $N_{CB,nfb}$+1 and code block $N_{CB}$ as both code blocks require HARQ feedback as seen in FIG. 17. It will be appreciated that the code blocks positioned between code blocks $N_{CB,nfb}$+1 and $N_{CB}$ are also appended with CRC since they require HARQ feedback. The process then ends at step 1912.

Figure 20:
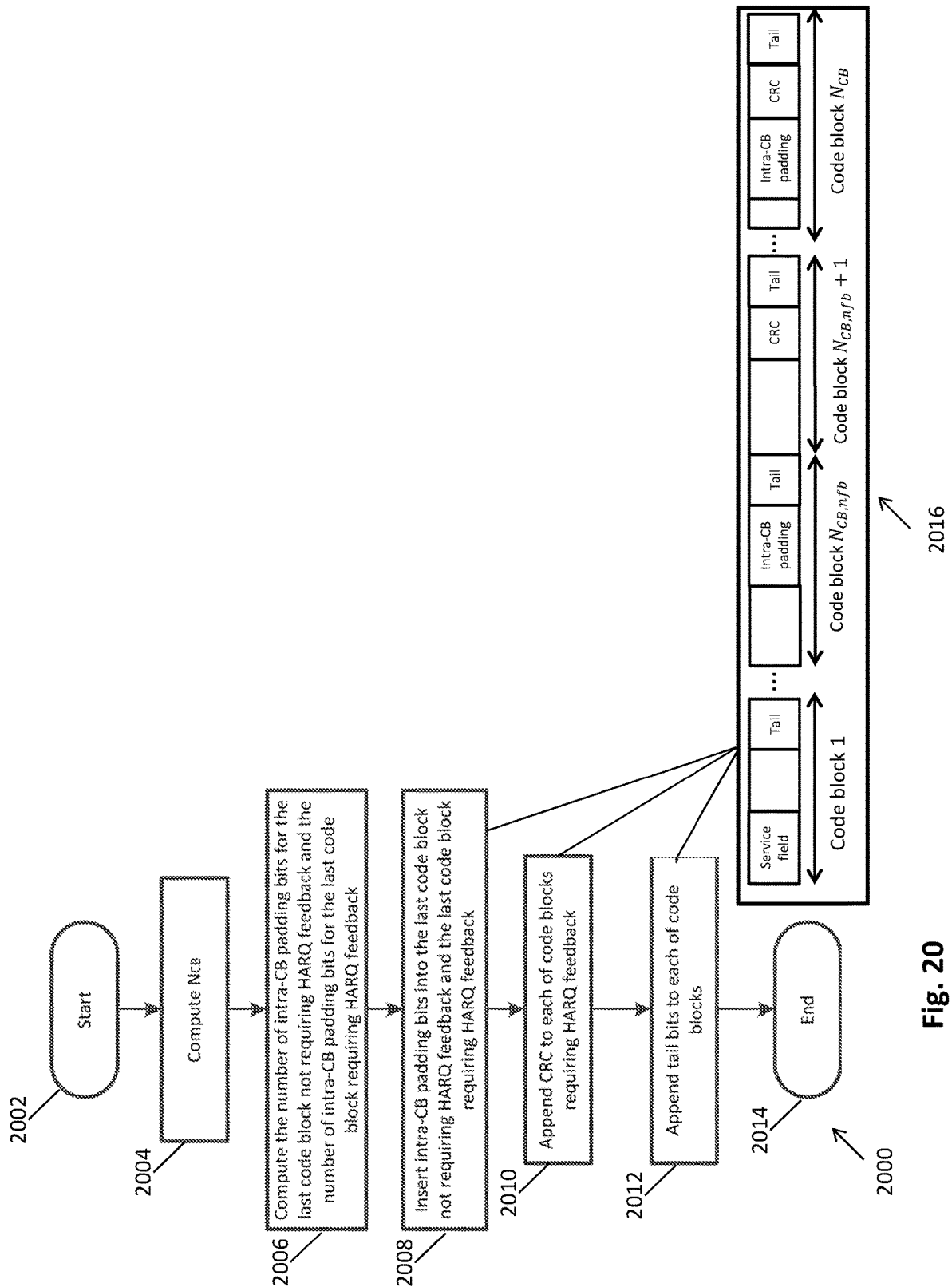
FIG. 20 shows a flowchart for type 5 code block segmentation having BCC.

FIG. 20 shows a flowchart 2000 for type 5 code block segmentation as depicted in FIG. 18. The process starts at step 2002. At step 2004, the value of $N_{CB}$ is computed by formula $N_{CB}=N_{CB,nfb}+N_{CB,fb}$, wherein $$N_{CB,nfb} = \left\lceil \frac{L_{MPDU,nfb} + N_{SERVICE}}{L_{CB} \cdot R} \right\rceil, N_{CB,fb} = \left\lceil \frac{L_{MPDU,fb} + N_{SERVICE}}{L_{CB} \cdot R - L_{CRC} - N_{Tail}} \right\rceil$$

and wherein $N_{CB,nfb}$ is the number of code blocks not requiring HARQ feedback, $N_{CB,fb}$ is the number of code blocks requiring HARQ feedback, $L_{MPDU,nfb}$ is the length of A-MPDU subframes not soliciting immediate acknowledgement, $L_{MPDU,fb}$ is the length of A-MPDU subframes soliciting immediate acknowledgement, $N_{SERVICE}$ is the number of bits in the service field, which is equal to 0 if code blocks requiring HARQ feedback do not include the service field, R is the code rate, $L_{CRC}$ is the length of CRC per code block and $N_{TAIL}$ is the number of tail bits per code block. At step 2006, the number of intra-CB padding bits for the last code block not requiring HARQ feedback is computed using formula $N_{IntraCB,nfb}=L_{CB}\cdot R\cdot N_{CB,nfb}-L_{MPDU,nfb}-N_{SERVICE}-N_{Tail}\cdot N_{CB,nfb}$, and the number of intra-CB padding bits for the last code block requiring HARQ feedback is computed using formula $N_{IntraCB,fb}=L_{CB}\cdot R\cdot N_{CB,fb}-L_{MPDU,fb}-N_{SERVICE}-L_{CRC}\cdot N_{CB,fb}-N_{Tail}\cdot N_{CB,fb}$, wherein $N_{IntraCB,nfb}$ is the number of intra-CB padding bits in the last code block not requiring HARQ feedback and $N_{IntraCB,fb}$ is the number of intra-CB padding bits in the last code block requiring HARQ feedback. At step 2008, intra-CB padding bits are inserted into the last code block not requiring HARQ feedback and the last code block requiring HARQ feedback. At step 2010, CRC is appended to each of code blocks requiring HARQ feedback. At step 2012, tail bits are appended to each code block. Steps 2008, 2010 and 2012 are depicted in detail by illustration 2016 wherein intra-CB padding bits are inserted into code block $N_{CB,nfb}$ (i.e. the last code block not requiring HARQ feedback as seen in FIG. 18) and code block $N_{CB}$ (i.e. the last code block requiring HARQ feedback as seen in FIG. 18), CRC are appended to code block $N_{CB,nfb}+1$ and code block $N_{CB}$ as both code blocks require HARQ feedback as seen in FIG. 18, and tail bits are appended to each code block as seen in FIG. 18. It will be appreciated that the code blocks positioned between code blocks $N_{CB,nfb}+1$ and $N_{CB}$ are also appended with tail bits, and also CRC since they require HARQ feedback. The process then ends at step 2014.

STA behavior for type 5 code block segmentation is the same as type 2 code block segmentation i.e. as shown in flowchart 1000 of FIG. 10A. Type 5 code block segmentation has similar advantages as type 4 code block segmentation except less code blocks may be required for an A-MPDU than type 4 code block segmentation. However, similar to type 4, code block based HARQ feedback mechanism needs to be developed since existing MPDU based acknowledgement mechanism for HARQ feedback cannot be reused for type 5 code block segmentation.

Different types of code block segmentation have their respective advantages and disadvantages. Generally, AP or STA can determine the code block segmentation type at its discretion depending on A-MPDU size and MCS.

The above-described examples for types 1-5 code block segmentation are in case where the data field contains an initial transmission. Examples pertaining to a data field including a retransmission are described below.

Figure 21:
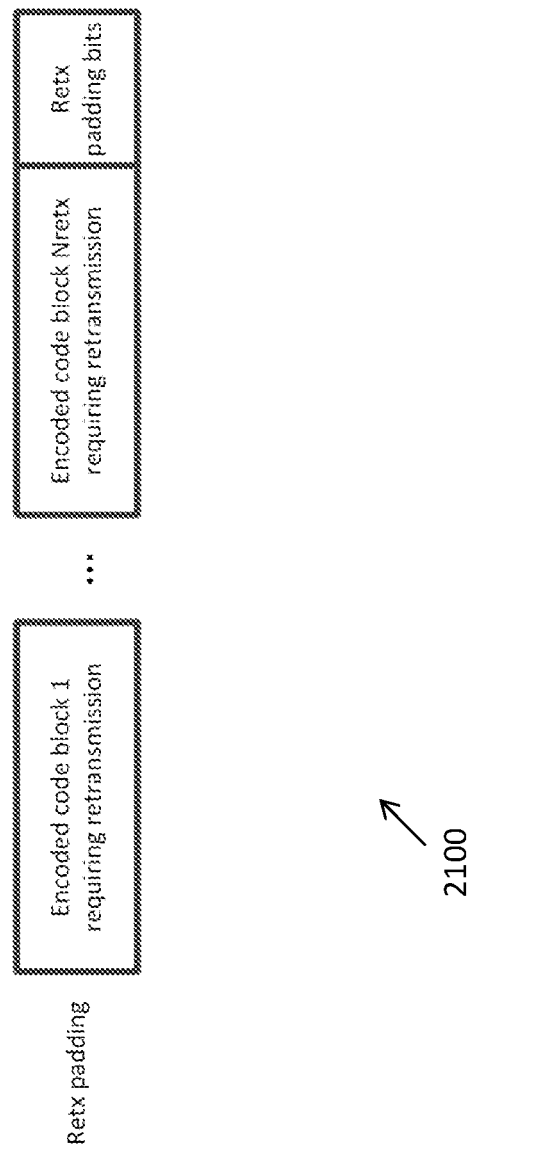
FIG. 21 shows an illustration of an encoding process of a data field including a retransmission when HARQ regular chase combining (CC) is used, according to various embodiments of the present disclosure.

FIG. 21 shows an illustration of an encoding process of a data field including a retransmission when HARQ regular CC is used. HARQ regular CC can be treated as a special case of HARQ punctured CC (i.e. puncturing pattern for HARQ CC indicates no puncturing for HARQ regular CC). For both HARQ CC and HARQ IR, all code blocks for an A-MPDU are transmitted in an initial transmission, but only code blocks with NACK are transmitted in a retransmission. In the case of HARQ regular CC, similar to initial transmission, all encoded bits in each code block requiring retransmission are transmitted. As seen in FIG. 21, encoded code blocks 1 to $N_{retx}$ requiring retransmission are positioned and the last encoded code block $N_{retx}$ requiring retransmission is appended with retransmitted (retx) padding bits. The remaining transmitter processing is the same as 11ax HE SU PPDU.

Figure 22:
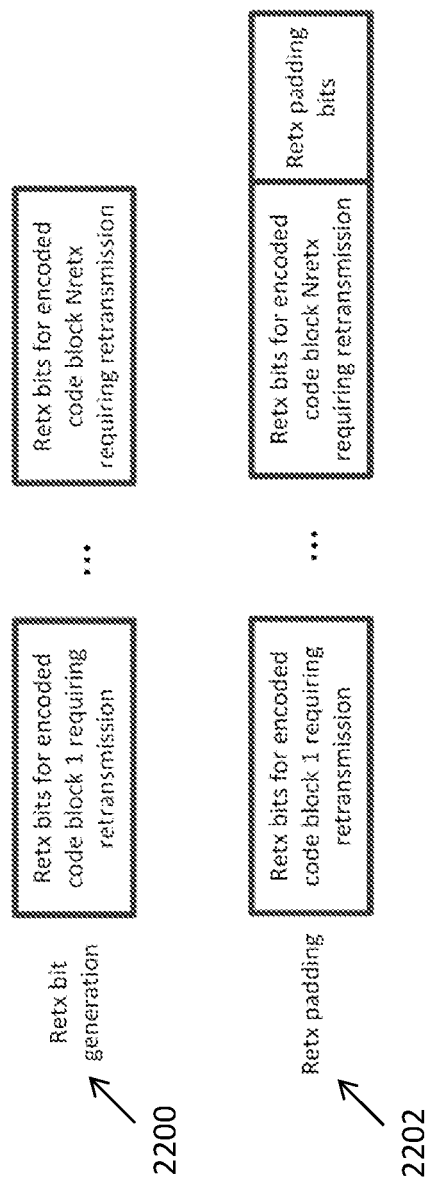
FIG. 22 shows an illustration of an encoding process of a data field including a retransmission when HARQ incremental redundancy (IR) is used or HARQ punctured CC is used, according to various embodiments of the present disclosure.

FIG. 22 shows an illustration of an encoding process of a data field including a retransmission when HARQ IR is used or HARQ punctured CC is used, according to various embodiments of the present disclosure. When HARQ IR is used, each code block is encoded using a mother code rate (e.g. ½). Further, retx bits for a code block requiring retransmission are extracted from the coded bits in the code block according to a redundancy version which may be indicated in HARQ-SIG field. When HARQ punctured CC is used, retx bits for a code block requiring retransmission are generated from coded bits in the code block according to a puncturing pattern which may be indicated in HARQ-SIG field. As seen in FIG. 22, retx bits for each code block requiring retransmission are generated as illustrated in 2200 and the last encoded code block $N_{retx}$ requiring retransmission is appended with retx padding bits as illustrated in 2202. The remaining transmitter processing is the same as 11ax HE SU PPDU.

For HARQ regular CC, the number of retx padding bits can be computed by formulae $N_{retxPadding}=N_{retxSYM}\cdot N_{CBPS}-N_{retx}\cdot N_{CW,CB}\cdot 1944$ and $$N_{retxSYM} = \left\lceil \frac{N_{retx} \cdot N_{CW,CB} \cdot 1944}{N_{CBPS}} \right\rceil.$$

For HARQ punctured CC or HARQ IR, the number of retx padding bits can be computed by formulae $N_{retxPadding}=N_{retxSYM}\cdot N_{CBPS}-N_{retx}\cdot N_{CW,CB}\cdot 1944\cdot P_{retx}$ and $$N_{retxSYM} = \left\lceil \frac{N_{retx} \cdot N_{CW,CB} \cdot 1944 \cdot P_{retx}}{N_{CBPS}} \right\rceil,$$

wherein $P_{retx}$ is the retx percentage (i.e. the ratio of the number of retx bits to the number of coded bits in a code block).

Under HARQ punctured CC, retx bits are uniformly extracted from coded bits in a code block requiring retransmission according to a puncturing pattern, which may be indicated in HARQ-SIG field. The number of available puncturing patterns depends on retx percentage, wherein the number of available puncturing patterns for a larger retx percentage shall not be greater than that for a smaller retx percentage. The retx percentage depends on packet error rate (PER) of a current transmission, wherein the retx percentage for a larger PER shall not be less than that for a smaller PER. A receiver having incorrectly received part of or whole A-MPDU carried in the data field of a transmission signal (wherein the transmission signal may be in the format of the EHT basic PPDU 200) may recommend a retx percentage to a corresponding transmitter together with the NACK feedback to assist the transmitter in selecting an appropriate puncturing pattern for retransmission. An example of the relationship among available puncturing patterns, retx percentage and PER is illustrated in Table 1 below:

TABLE 1

| Available puncturing patterns | Retx percentage | PER |
|---|---|---|
| Pattern 1 | ¾ | 0.3~0.4 |
| Patterns 1, 2 | ½ | 0.2~0.3 |
| Patterns 1, 2, 3 | ⅓ | 0.1~0.2 |
| Patterns 1, 2, 3, 4 | ¼ | ≤0.1 |

For example, in a case where retx percentage is ½, 2 puncturing patterns, i.e. patterns 1 and 2, are available. For pattern 1, retx bits may be even numbered coded bits in a code block requiring retransmission. For pattern 2, retx bits may be odd numbered coded bits in a code block requiring retransmission. It will be appreciated that other variations of puncturing patterns are also possible.

Figure 23:
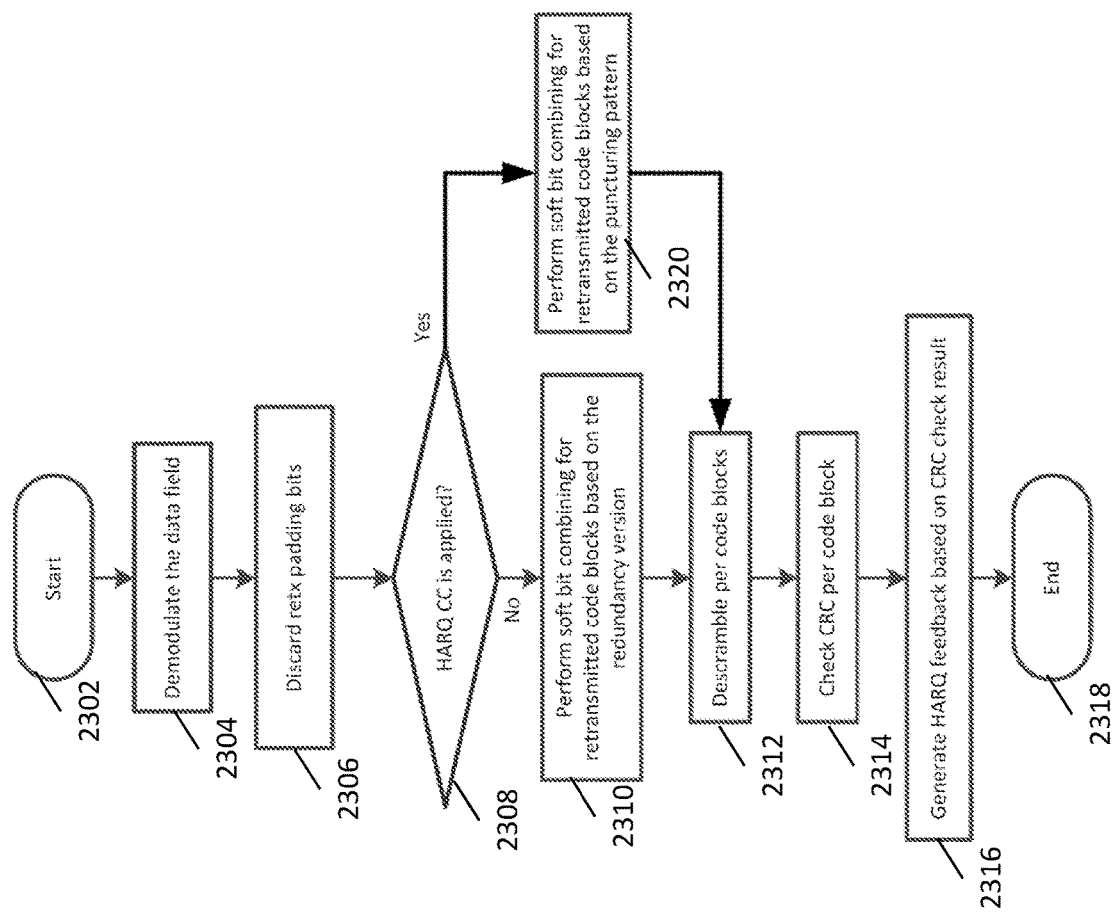
FIG. 23 shows a flowchart for STA behaviour for a data field including a retransmission, according to various embodiments of the present disclosure.

FIG. 23 shows a flowchart for STA behaviour for a data field including a retransmission, according to various embodiments of the present disclosure. The process starts from step 2302 and proceeds to step 2304 where the data field is demodulated. At step 2306, retx padding bits are discarded. At step 2308, it is determined whether HARQ CC is applied. If it is determined that HARQ CC is applied, the process proceeds to step 2320 where soft bit combining for retransmitted code blocks based on the puncturing pattern is performed, and then to step 2312 where the code blocks are descrambled. On the other hand, if it is determined at step 2308 that HARQ CC is not applied (i.e. HARQ IR is applied), the process proceeds to step 2310 where soft bit combining for retransmitted code blocks based on the redundancy version is performed, and then to step 2312. At step 2314, CRC per code block is checked. At step 2316, HARQ feedback is generated based on the CRC check result of step 2314. The process then ends at step 2318.

Figure 24:
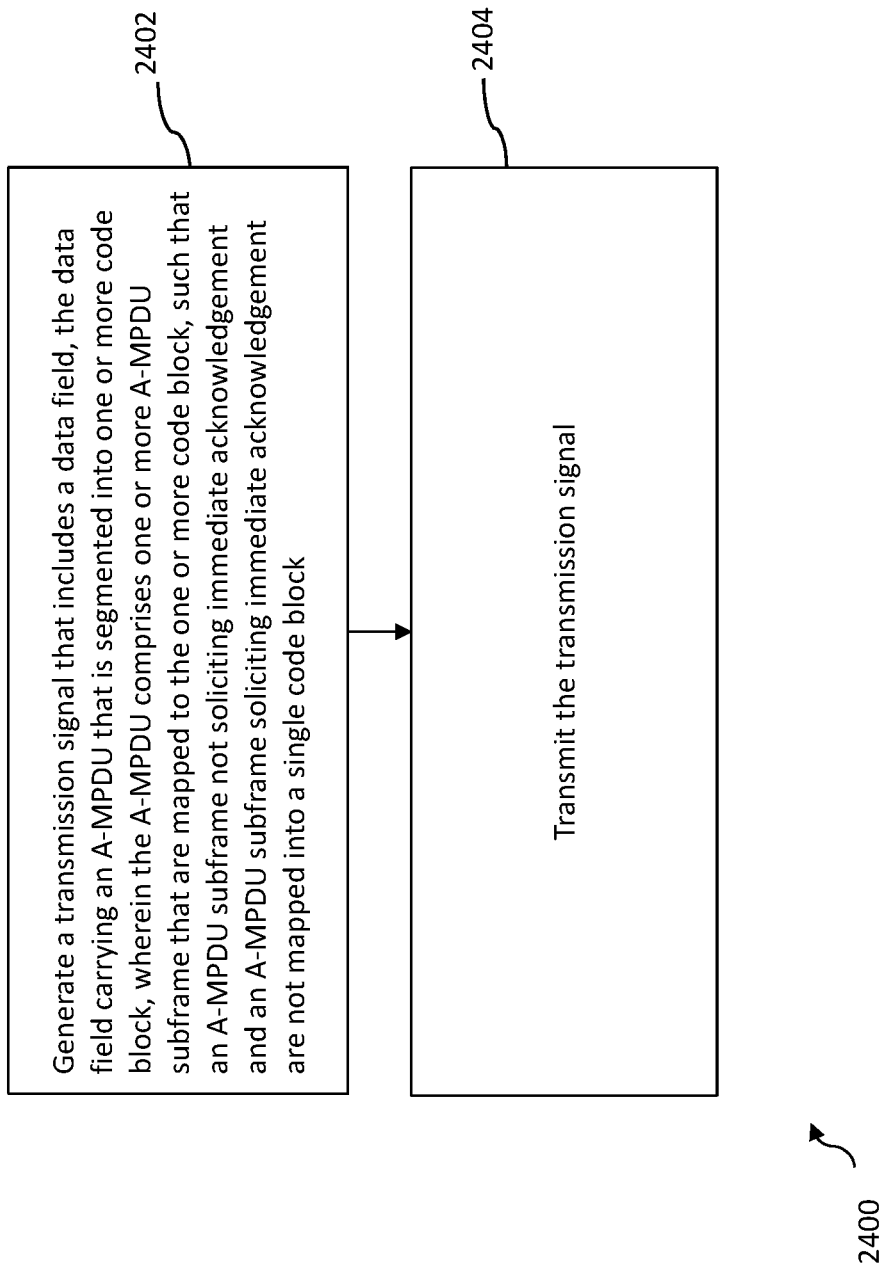
FIG. 24 shows a flow diagram of a communication method for implementation of HARQ transmission in accordance with various embodiments of the present disclosure.

FIG. 24 shows a flow diagram of a communication method for implementation of HARQ transmission in accordance with various embodiments of the present disclosure. At step 2402, a transmission signal that includes a data field, the data field carrying an A-MPDU that is segmented into one or more code block is generated, wherein the A-MPDU comprises one or more A-MPDU subframe that are mapped to the one or more code block, such that an A-MPDU subframe not soliciting immediate acknowledgement and an A-MPDU subframe soliciting immediate acknowledgement are not mapped into a single code block. At step 2404, the transmission signal is transmitted.

Figure 25:
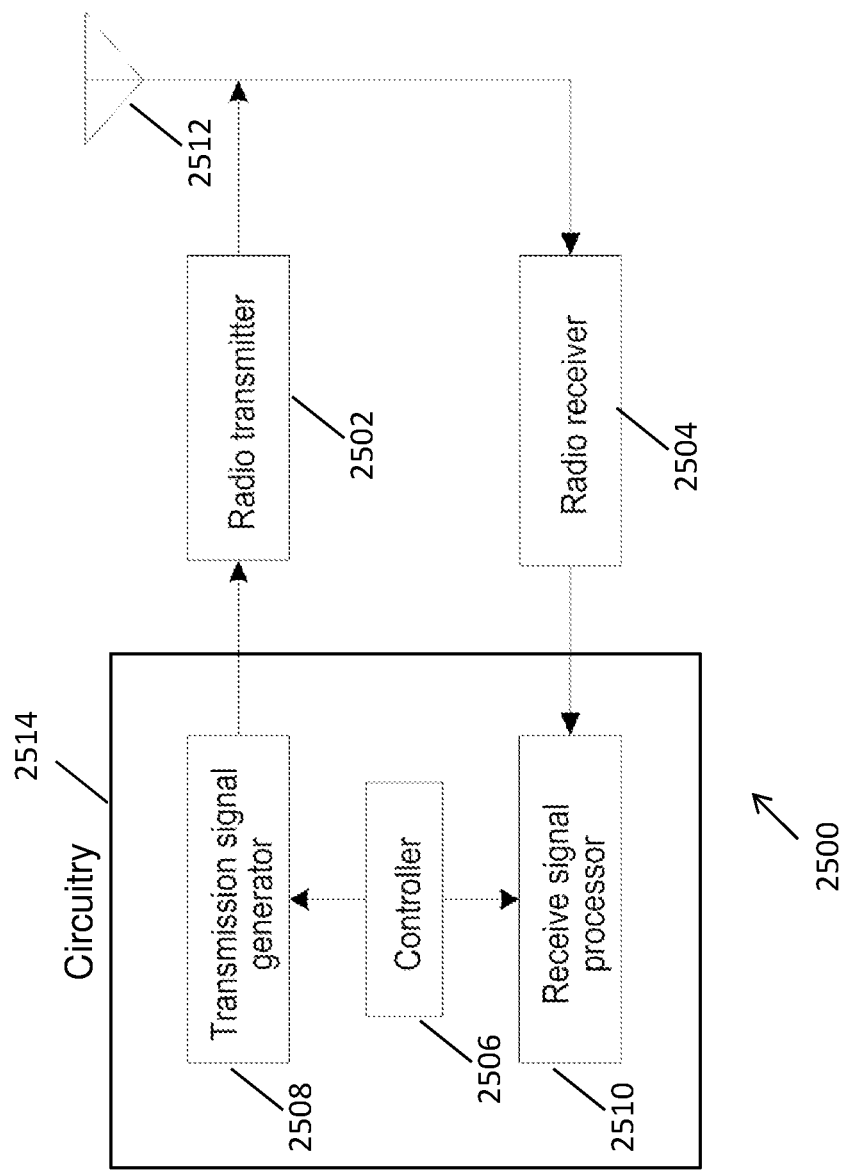
FIG. 25 shows a schematic example of communication apparatus in accordance with various embodiments. The communication apparatus may be implemented as an AP or a STA and configured for HARQ transmission in accordance with various embodiments of the present disclosure.

FIG. 25 shows a schematic, partially sectioned view of a communication apparatus 2500 according to various embodiments. The communication apparatus 2500 may be implemented as an AP or a STA according to various embodiments. As shown in FIG. 25, the communication apparatus 2500 may include circuitry 2514, at least one radio transmitter 2502, at least one radio receiver 2504 and multiple antennas 2512 (for the sake of simplicity, only one antenna is depicted in FIG. 25 for illustration purposes). The circuitry may include at least one controller 2506 for use in software and hardware aided execution of tasks it is designed to perform, including control of communications with one or more other communication apparatuses in a MIMO wireless network. The at least one controller 2506 may control at least one transmission signal generator 2508 for generating transmission signals e.g. in the form of the EHT basic PPDU 200 to be sent through the at least one radio transmitter 2502 to one or more other communication apparatuses and at least one receive signal processor 2510 for processing HARQ feedback information received through the at least one radio receiver 2504 from the one or more other communication apparatuses. The at least one transmission signal generator 2508 and the at least one receive signal processor 2510 may be stand-alone modules of the communication apparatus 2500 that communicate with the at least one controller 2506 for the above-mentioned functions, as shown in FIG. 25. Alternatively, the at least one transmission signal generator 2508 and the at least one receive signal processor 2510 may be included in the at least one controller 2506. It is appreciable to those skilled in the art that the arrangement of these functional modules is flexible and may vary depending on the practical needs and/or requirements. The data processing, storage and other relevant control apparatus can be provided on an appropriate circuit board and/or in chipsets. In various embodiments, when in operation, the at least one radio transmitter 2502, at least one radio receiver 2504, and at least one antenna 2512 may be controlled by the at least one controller 2506.

The communication apparatus 2500, when in operation, provides functions required for HARQ transmissions. For example, the communication apparatus 2500 may be a communication apparatus, and the at least one transmission signal generator 2508 of the circuitry 2514, may, in operation, generate a transmission signal that includes a data field, the data field carrying an A-MPDU that is segmented into one or more code block, wherein the A-MPDU comprises one or more A-MPDU subframe that are mapped to the one or more code block, such that an A-MPDU subframe not soliciting immediate acknowledgement and an A-MPDU subframe soliciting immediate acknowledgement are not mapped into a single code block; and the at least one radio transmitter 2502 may, in operation, transmit the generated transmission signal.

A code block may not require HARQ feedback if one or more A-MPDU subframe mapped to the code block does not solicit immediate acknowledgement; and a code block may require HARQ feedback if one or more A-MPDU subframe mapped to the code block solicits immediate acknowledgement. A-MPDU subframes soliciting immediate acknowledgement may be placed consecutively in the A-MPDU. Each code block requiring HARQ feedback may be attached with a CRC. An A-MPDU subframe may be mapped to a single code block when a size of the A-MPDU subframe is smaller than or equal to that of the code block, and wherein the code block may be aligned with a boundary of the A-MPDU subframe. An A-MPDU subframe may be mapped to more than one code blocks when a size of the A-MPDU subframe is larger than that of a code block, wherein the last of the more than one code blocks may be aligned with a boundary of the A-MPDU subframe. More than one A-MPDU subframes may be mapped to a single code block when a size of the more than one A-MPDU subframes is smaller than or equal to that of the code block, wherein the code block is aligned with a boundary of the last of the more than one A-MPDU subframes. A-MPDU subframes not soliciting immediate acknowledgement may be mapped to one or more code block not requiring HARQ feedback, such that the last of the one or more code block not requiring HARQ feedback is aligned with a boundary of the last A-MPDU subframe not soliciting immediate acknowledgement. A-MPDU subframes soliciting immediate acknowledgement may be mapped to one or more code block requiring HARQ feedback, the last of the one or more code block requiring HARQ feedback is aligned with a boundary of the last A-MPDU subframe soliciting immediate acknowledgement. The A-MPDU may be carried in a data field of the transmission signal. Intra-CB padding may be applied to the last of the one or more code block such that the last of the one or more code block is aligned with a symbol segment boundary in a last orthogonal frequency division multiplexing (OFDM) symbol if there is no STBC applied to a data field of the transmission signal, or in a last two OFDM symbols if there is STBC applied to a data field of the transmission signal. The number of bits per code block may be independent of modulation and coding scheme (MCS) applied to a data field of the transmission signal.

The A-MPDU may be prepended by a service field, wherein the circuitry 2514 may be configured to perform scrambling of bits for each code block such that an initial state of each scrambling is same as a first N bits of the service field wherein N is a determined positive integer. Tail bits may be appended to each code block if BCC encoding is used.

The receiver 2504 may be configured to receive a NACK of one or more code block from the another communication apparatus in response to transmitting the A-MPDU, the NACK indicating that retransmission of the one or more code block is required; the at least one transmission signal generator 2508 of the circuitry 2514 may be further configured to generate retransmitted bits from coded bits in the one or more code block requiring retransmission according to a puncturing pattern or redundancy version indicated in a HARQ-SIG field of the transmission signal; and the transmitter 2502 may be configured to transmit the generated retransmitted bits to the another communication apparatus in response to the NACK.

As described above, the embodiments of the present disclosure provide an advanced communication system, communication methods and communication apparatuses that enable HARQ operation in extremely high throughput WLAN networks.

The present disclosure can be realized by software, hardware, or software in cooperation with hardware. Each functional block used in the description of each embodiment described above can be partly or entirely realized by an LSI such as an integrated circuit, and each process described in each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus.

Some non-limiting examples of such a communication apparatus include a phone (e.g. cellular (cell) phone, smart phone), a tablet, a personal computer (PC) (e.g. laptop, desktop, netbook), a camera (e.g. digital still/video camera), a digital player (digital audio/video player), a wearable device (e.g. wearable camera, smart watch, tracking device), a game console, a digital book reader, a telehealth/telemedicine (remote health and medicine) device, and a vehicle providing communication functionality (e.g. automotive, airplane, ship), and various combinations thereof.

The communication apparatus is not limited to be portable or movable, and may also include any kind of apparatus, device or system being non-portable or stationary, such as a smart home device (e.g. an appliance, lighting, smart meter, control panel), a vending machine, and any other "things" in a network of an "Internet of Things (loT)".

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

It will be understood that while some properties of the various embodiments have been described with reference to a device, corresponding properties also apply to the methods of various embodiments, and vice versa.

It will be appreciated by a person skilled in the art that numerous variations and/or modifications may be made to the present disclosure as shown in the specific embodiments without departing from the spirit or scope of the disclosure as broadly described. The present embodiments are, therefore, to be considered in all respects illustrative and not restrictive.

The invention claimed is:

1. A communication apparatus, comprising:
circuitry which, in operation, generates a transmission signal that includes a data field, the data field carrying an aggregated medium access control protocol data unit (A-MPDU) that is segmented into one or more code blocks; and
a transmitter which, in operation, transmits the transmission signal to another communication apparatus, wherein,
the A-MPDU comprises one or more A-MPDU subframes that are mapped to the one or more code blocks, such that a first A-MPDU subframe not soliciting immediate acknowledgement and a second A-MPDU subframe soliciting immediate acknowledgement are not mapped into a single code block,
in response to a first code block in which the first A-MPDU subframe does not solicit immediate acknowledgement, the first code block is mapped to align with a boundary of the first A-MPDU subframe, and
in response to a second code block in which the second A-MPDU subframe solicits immediate acknowledgement, the second code block is mapped to align with a boundary of the second A-MPDU subframe.

2. The communication apparatus according to claim 1, wherein a code block does not require hybrid automatic repeat request (HARQ) feedback if one or more A-MPDU subframes mapped to the code block do not solicit immediate acknowledgement; and a code block requires HARQ feedback if one or more A-MPDU subframes mapped to the code block solicit immediate acknowledgement.

3. The communication apparatus according to claim 1, wherein A-MPDU subframes soliciting immediate acknowledgement are placed consecutively in the A-MPDU.

4. The communication apparatus according to claim 1, wherein each code block requiring HARQ feedback is attached with a CRC.

5. The communication apparatus according to claim 1, wherein an A-MPDU subframe is mapped to a single code block when a size of the A-MPDU subframe is smaller than or equal to that of the code block, and wherein the code block is aligned with a boundary of the A-MPDU subframe.

6. The communication apparatus according to claim 1, wherein an A-MPDU subframe is mapped to more than one code block when a size of the A-MPDU subframe is larger than that of a code block, and wherein a last of the more than one code block is aligned with a boundary of the A-MPDU subframe.

7. The communication apparatus according to claim 1, wherein more than one A-MPDU subframes are mapped to a single code block when a size of the more than one A-MPDU subframes is smaller than or equal to that of the code block, and wherein the code block is aligned with a boundary of a last of the more than one A-MPDU subframes.

8. The communication apparatus according to claim 1, wherein A-MPDU subframes not soliciting immediate acknowledgement are mapped to one or more code blocks not requiring HARQ feedback, such that a last of the one or more code blocks not requiring HARQ feedback is aligned with a boundary of a last A-MPDU subframe not soliciting immediate acknowledgement.

9. The communication apparatus according to claim 1, wherein A-MPDU subframes soliciting immediate acknowledgement are mapped to one or more code blocks requiring HARQ feedback, a last of the one or more code blocks requiring HARQ feedback is aligned with a boundary of a last A-MPDU subframe soliciting immediate acknowledgement.

10. The communication apparatus according to claim 1, wherein intra-code block padding is applied to a last of the one or more code blocks such that the last of the one or more code blocks is aligned with a symbol segment boundary in a last orthogonal frequency division multiplexing (OFDM) symbol if there is no Space-Time Block Coding (STBC) applied to a data field of the transmission, or in a last two OFDM symbols if there is STBC applied to a data field of the transmission signal.

11. The communication apparatus according to claim 1, wherein a number of bits per code block is independent of a modulation and coding scheme (MCS) applied to a data field of the transmission signal.

12. The communication apparatus according to claim 1, wherein the A-MPDU is prepended by a service field, wherein the circuitry is configured to perform scrambling of bits for each code block such that an initial state of each scrambling is same as a first N bits of the service field wherein N is a determined positive integer.

13. The communication apparatus according to claim 1, comprising:
a receiver which, in operation, receives a non-acknowledgement (NACK) of one or more code blocks from the another communication apparatus in response to transmitting the A-MPDU, the NACK indicating that retransmission of the one or more code blocks is required;
wherein the circuitry is configured to generate retransmitted bits from coded bits in the one or more code blocks requiring retransmission according to a puncturing pattern or redundancy version indicated in a HARQ-SIG field of the transmission signal; and
wherein the transmitter is configured to transmit the generated retransmitted bits to the another communication apparatus in response to the NACK.

14. A communication method, comprising:
generating a transmission signal that includes a data field, the data field carrying an aggregated medium access control protocol data unit (A-MPDU) that is segmented into one or more code blocks, wherein
the A-MPDU comprises one or more A-MPDU subframes that are mapped to the one or more code blocks, such that a first A-MPDU subframe not soliciting immediate acknowledgement and a second A-MPDU subframe soliciting immediate acknowledgement are not mapped into a single code block,
in response to a first code block in which the first A-MPDU subframe does not solicit immediate acknowledgement, the first code block is mapped to align with a boundary of the first A-MPDU subframe, and
in response to a second code block in which the second A-MPDU subframe solicits immediate acknowledgement, the second code block is mapped to align with a boundary of the second A-MPDU subframe; and
transmitting the transmission signal.

\* \* \* \* \*